US012283254B2

(12) United States Patent
Kang et al.

(10) Patent No.: US 12,283,254 B2
(45) Date of Patent: Apr. 22, 2025

(54) BACKLIGHT MODULE, DISPLAY DEVICE, AND METHOD FOR DRIVING BACKLIGHT UNIT

(71) Applicant: SAMSUNG ELECTRONICS CO., LTD., Suwon-si (KR)

(72) Inventors: Sugyeung Kang, Suwon-si (KR); Sungmok Lee, Suwon-si (KR); Changyeon Cho, Suwon-si (KR); Kang Joo Kim, Suwon-si (KR); Sunkwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/373,062

(22) Filed: Sep. 26, 2023

(65) Prior Publication Data

US 2024/0290289 A1 Aug. 29, 2024

(30) Foreign Application Priority Data

Feb. 28, 2023 (KR) ........................ 10-2023-0026763
May 10, 2023 (KR) ........................ 10-2023-0060613

(51) Int. Cl.
*G09G 3/34* (2006.01)

(52) U.S. Cl.
CPC ..... *G09G 3/3426* (2013.01); *G09G 2320/064* (2013.01)

(58) Field of Classification Search
CPC ........................ G09G 3/3426; G09G 2320/064
See application file for complete search history.

(56) References Cited

U.S. PATENT DOCUMENTS

| | | | |
|---|---|---|---|
| 8,310,437 B2 | 11/2012 | Maruyama et al. | |
| 8,564,507 B2 | 10/2013 | Jang et al. | |
| 8,772,969 B2 | 7/2014 | Jung et al. | |
| 9,165,514 B2 | 10/2015 | Choi et al. | |
| 11,257,444 B2 | 2/2022 | Wu et al. | |
| 11,355,058 B2 | 6/2022 | Huang et al. | |
| 2010/0264743 A1 | 10/2010 | Jung et al. | |
| 2018/0018924 A1* | 1/2018 | Mao | G09G 3/3406 |
| 2019/0251914 A1* | 8/2019 | Chen | G09G 3/342 |
| 2022/0382105 A1 | 12/2022 | Harada | |
| 2023/0205000 A1* | 6/2023 | Kang | G02F 1/133612 362/100 |

FOREIGN PATENT DOCUMENTS

| | | |
|---|---|---|
| KR | 10-1079900 B1 | 11/2011 |
| KR | 10-1706578 B1 | 2/2017 |

* cited by examiner

*Primary Examiner* — Abhishek Sarma
(74) *Attorney, Agent, or Firm* — Sughrue Mion, PLLC

(57) ABSTRACT

A backlight module includes a pixel driver integrated circuit (PDIC) configured to generate a switch control signal and a pulse control signal, the pulse control signal including timing information and dimming data, a pixel integrated circuit (PIC) configured to generate a pulse modulation signal based on the pulse control signal, a switch group configured to transfer a driving voltage based on the switch control signal, and a backlight unit (BLU) including a first end connected to the switch group and a second end connected to the PIC, the BLU configured to emit light on a panel based on the driving voltage and the pulse modulation signal, where the PDIC is configured to generate the switch control signal and the pulse control signal such that a light emitting diode emits light at a time point at which a pixel of the panel operates.

20 Claims, 14 Drawing Sheets

400

BACKLIGHT MODULE, DISPLAY DEVICE, AND METHOD FOR DRIVING BACKLIGHT UNIT

CROSS-REFERENCE TO RELATED APPLICATION

This application is based on and claims priority to Korean Patent Application No. 10-2023-0060613 filed in the Korean Intellectual Property Office on May 10, 2023, and Korean Patent Application No. 10-2023-0026763 filed in the Korean Intellectual Property Office on Feb. 28, 2023, the disclosures of which are incorporated herein by reference in their entireties.

BACKGROUND

1. Field

Example embodiments of the disclosure relate to a backlight module, a display device, and a method for driving a backlight unit (BLU).

2. Description of the Related Art

Display devices may be classified into a self-luminous display device using a self-light emitting display panel such as an organic light emitting diode (OLED) and a non-self-luminous display device using a display panel such as a liquid crystal display (LCD) required to receive light from a backlight unit.

The LCD is widely used because of its minimal thickness, light weight, low driving voltage and low power consumption compared to other display devices. However, while the LCD is driven by a line scan method, the backlight unit is driven regardless of the driving method of the LCD, resulting in a blurred display image.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide a backlight module, a display device, and a method for driving a backlight unit (BLU), where the BLU may be driven synchronously with the scan driving method of the liquid crystal display in order to provide a clear image.

Additional aspects will be set forth in part in the description which follows and, in part, will be apparent from the description, or may be learned by practice of the presented embodiments.

According to an aspect of an example embodiment, a backlight module may include a pixel driver integrated circuit (PDIC) configured to generate a switch control signal and a pulse control signal, the pulse control signal including timing information and dimming data, a pixel integrated circuit (PIC) configured to generate a pulse modulation signal based on the pulse control signal, a switch group configured to transfer a driving voltage based on the switch control signal, and a BLU including a first end connected to the switch group and a second end connected to the PIC, the BLU configured to emit light on a panel based on the driving voltage and the pulse modulation signal, where the PDIC is configured to generate the switch control signal and the pulse control signal such that a light emitting diode emits light at a time point at which a pixel of the panel operates.

According to an aspect of an example embodiment, a display device may include a controller configured to generate backlight data and a driving control signal based on an image signal, a driver circuit configured to generate, based on the driving control signal, a scan signal and a pixel signal, a panel including a plurality of pixels, the panel configured to, based on the scan signal and the pixel signal, receive light and display an image and a backlight module configured to alternately operate a plurality of light emitting diodes based on the backlight data while the panel displays one frame of the image.

According to an aspect of an example embodiment, a method of driving a BLU may include controlling a first switch and a second switch to alternately open and close based on a vertical synchronization signal of a current frame, applying a first pulse modulation signal to a light emitting diode connected to the first switch based on the first switch being closed and applying a second pulse modulation signal to a light emitting diode connected to the second switch based on the second switch being closed.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Figure 1:
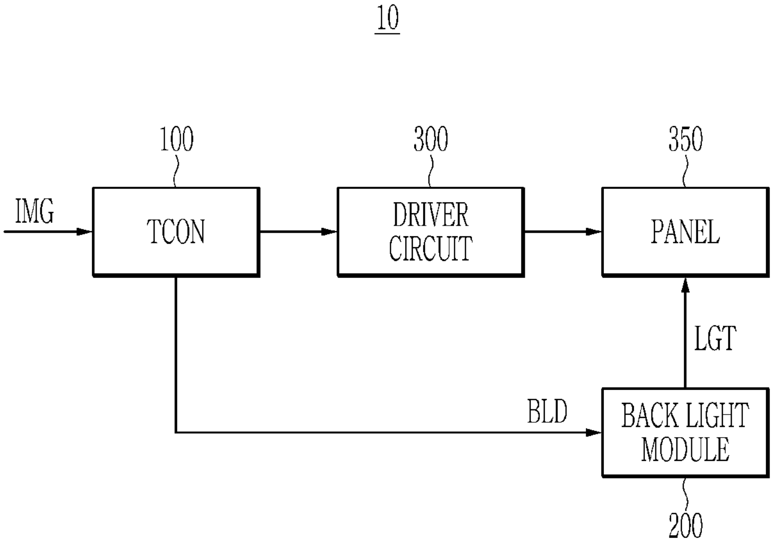
FIG. 1 is a block diagram of a display device according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Accordingly, the drawings and description are to be regarded as illustrative in nature and not restrictive. Like reference numerals designate like elements throughout the specification. In the flowchart described with reference to the drawings, the order of operations may be changed, several operations may be merged, a certain operation may be divided, and a specific operation may not be performed.

In addition, expressions described in the singular may be interpreted in the singular or plural unless explicit expressions such as "one" or "single" are used. Terms including ordinal numbers, such as first and second, may be used to describe various components, but the components are not limited by these terms. These terms may be used for the purpose of distinguishing one component from another.

FIG. 1 is a block diagram of a display device according to an embodiment.

Referring to FIG. 1, a display device 10 according to an embodiment may be a device capable of processing an image signal IMG received from the outside and visually displaying the processed image. The image signal IMG may be at least one frame, and the display device 10 may be mounted in an electronic device having an image display function. The electronic device may be a television (TV), a monitor, a vehicle electronic device, a portable electronic device, and the like. A portable electronic device may be implemented as a laptop computer, a mobile phone, a smart phone, a tablet personal computer (PC), a mobile Internet device (MID), a personal digital assistant (PDA), an enterprise digital assistant (EDA), a wearable device, and the like.

The display device 10 may include a timing controller (TCON) 100, a backlight module 200, a driver circuit 300, and a panel 350.

The TCON 100 may generate a driving control signal based on the image signal IMG. The driving control signal may include a gate control signal and a data control signal. For example, the TCON 100 may generate the data control signal based on image data of the image signal IMG, and generate the gate control signal based on a synchronization signal of the image signal IMG. The TCON 100 may transmit the driving control signal to the driver circuit 300.

The driver circuit 300 may include a gate driver circuit configured to generate a scan signal based on the gate control signal and a data driver circuit configured to generate a pixel signal based on the data control signal. The driver circuit 300 may transmit the scan signal and the pixel signal to the panel 350. The driver circuit 300 may operate the panel 350 in a line scan manner. In an embodiment, the panel 350 may be implemented as a liquid crystal display (LCD).

In addition, the TCON 100 may receive the image signal IMG, and generate a backlight data BLD by converting a data format of the image signal IMG based on an interface specification of the backlight module 200. The backlight data BLD may include dimming data and synchronization data. The dimming data may include brightness information about an image, and the synchronization data may include information about a vertical synchronization signal with which one frame of the image begins. The TCON 100 may transmit the backlight data BLD to the backlight module 200.

The backlight module 200 may be a device that illuminates the panel 350. The backlight module 200 may emit light LGT toward the panel 350 from a rear surface of the panel 350. The backlight module 200 may include a light emitting diode (LED) as a light source. The backlight module 200 may control a brightness of the LED by adjusting a driving current by using a pulse width modulation (PWM) method or a pulse amplitude modulation (PAM) method.

The backlight module 200 may operate the LED in synchronization with the time when the driver circuit 300 operates the panel 350. That is, the backlight module 200 may operate the LED in the line scan manner. In an embodiment, the backlight module 200 may include a plurality of line switches in a number corresponding to the quantity of LED lines, and the plurality of line switches may be connected to a plurality of LED lines. That is, one line switch may be connected to one LED line, such that the line switch and the LED line may have a one-to-one correspondence. Since the backlight module 200 sequentially opens and closes the plurality of line switches to sequentially apply a driving voltage to each LED line, the backlight module 200 may operate in a line scan manner.

In an embodiment, the backlight module 200 may include common switches as many as the quantity of subframes divided from one frame, and a plurality of common switches may be connected to the plurality of LED lines. That is, one common switch may be connected to a predetermined quantity of LED lines, and the common switch and LED lines may have a one-to-many correspondence. Since the backlight module 200 alternately opens and closes the plurality of the common switches and applies different pulse modulation signals to each LED line based on opening and closing times of the common switches, the backlight module 200 may operate in a line scan manner.

Accordingly, since the backlight module 200 and the panel 350 simultaneously operate in a line scan manner, a mismatch between the backlight module 200 and the panel 350 may be eliminated and an image may be displayed clearly.

Figure 2:
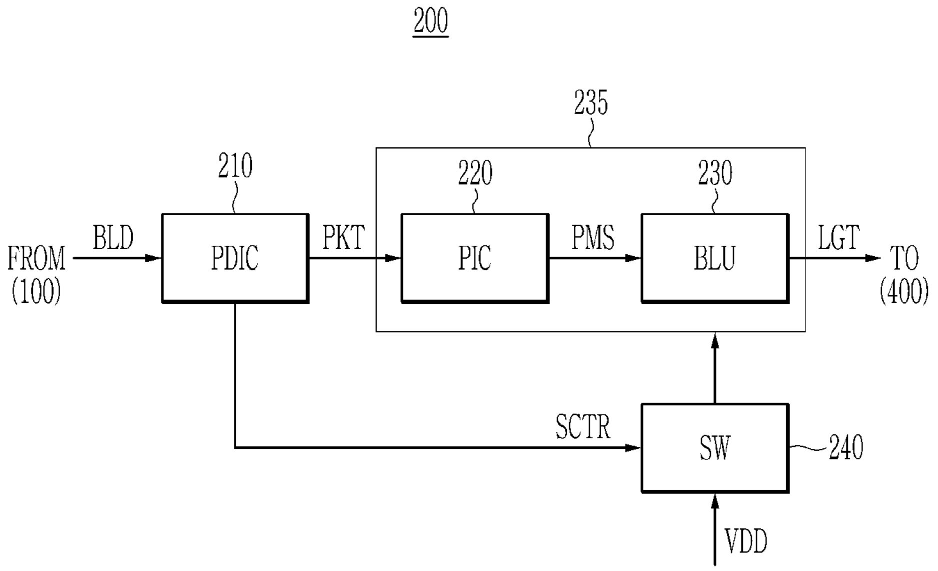
FIG. 2 is a block diagram of a backlight module according to an embodiment.

FIG. 2 is a block diagram of a backlight module according to an embodiment.

Referring to FIG. 2, the backlight module 200 according to an embodiment may include a pixel driver integrated circuit (PDIC) 210, a pixel integrated circuit (PIC) 220, a backlight unit (BLU) 230, and a switch group (SW) 240. The pixel integrated circuit 220 and the BLU 230 may form one set 235. The one set 235 may receive a driving voltage VDD when the SW 240 is closed, and may not receive the driving voltage VDD when the SW 240 is opened.

The PDIC 210 may generate a switch control signal SCTR based on the synchronization data of the backlight data BLD received from the TCON 100. The switch control signal SCTR may be a signal to control opening/closing of the SW 240. For example, a switch control signal may include a start time point of the opening and closing of the SW 240, an open period of the SW 240, a closed period of the SW 240, a pause period of the SW 240, and the like. The PDIC 210 may generate the switch control signal SCTR such that the SW 240 opens and closes several times in one frame display period. The open period and the closed period of the SW 240 may be referred to as a subframe period.

In an embodiment, the PDIC 210 may generate the switch control signal SCTR based on the time point at which logic level of the synchronization data transitions. For example, the PDIC 210 may generate the switch control signal SCTR such that the SW 240 begins the opening and closing after a predetermined delay from the time point at which logic level of the synchronization data transitions from LOW to HIGH. In an embodiment, the PDIC 210 may include a counter to perform the delay from a logic point of view. For example, the counter may use a clock signal to perform the delay. The clock signal may be a signal generated internally by the backlight module 200 or a signal received from the outside. The counter may generate the switch control signal SCTR when the clock signal toggles a predetermined number of times from the time point at which logic level of the synchronization data transitions. In an embodiment, the PDIC 210 may include a delay element for performing delay from an analog point of view. For example, the delay element may be implemented as an RC device, a delay cell, or a delay line to perform delay. The delay element may delay the input time by a predetermined time and then outputs the output, and the PDIC 210 may generate the switch control signal SCTR in response to the delayed signal.

In an embodiment, the PDIC 210 may generate the switch control signal SCTR such that the SW 240 begins the opening and closing at the time point at which the driver circuit 300 applies the pixel signal to the panel 350 of FIG. 1.

In an embodiment, the PDIC 210 may generate the switch control signal SCTR such that the SW 240 begins the opening and closing after a settling time point of the panel 350 of FIG. 1.

The PDIC 210 has been described to be configured to generate the switch control signal SCTR including a predetermined delay, but embodiments are not necessarily limited thereto, and the PIC 220 may be implemented to output a pulse modulation signal PMS after the predetermined delay from a logic level transition time point of the switch control signal SCTR. The PIC 220 may implement the predetermined delay by using the aforementioned counter or delay element or the like.

The SW 240 may be implemented to have a plurality of switches. In this case, the switch control signal SCTR may include a plurality of control signals for controlling respective switches. For example, when the SW 240 includes n switches (n is an integer larger than 1), the PDIC 210 may generate n control signals for controlling the n switches. The n control signals do not overlap each other, and thus the n switches may be alternately opened and closed. For example, the n control signals may be mutually exclusive in one frame display period. That is, at one time point during one frame display period, only one control signal among the n control signals may be at a high level (or a low level).

When the SW 240 includes the plurality of switches, the PDIC 210 may generate the plurality of switch control signals SCTR containing a start time point of the opening and closing of respective switches, an alternating sequence, a length of the subframe period, an interval between adjacent subframes, and a pause period. For example, when the SW 240 includes a first switch and a second switch, the start time point of the opening and closing may indicate a time point at which the first switch or the second switch is closed in one frame, the alternating sequence may indicate a first sequence of closing the second switch after the first switch or second sequence of closing the first switch after the second switch, the subframe period may indicate uniform division of one frame, the length of the subframe period may indicate a time length between the time points at which the first switch or the second switch is once closed and then opened, the interval between the adjacent subframes may indicate a time length between a time point at which the first switch (or the second switch) is opened and a time point at which the second switch (or the first switch) is closed, and the pause period may indicate an interval between the frames and may indicate a period where all switches are open.

The PDIC 210 may transmit the switch control signal SCTR to the SW 240, and the SW 240 may open and close based on the switch control signal SCTR.

The SW 240 may receive the driving voltage VDD. When the SW 240 is closed based on the switch control signal SCTR, the driving voltage VDD may be applied to the backlight unit 230, and when the SW 240 is opened, the driving voltage VDD may not be applied to the backlight unit 230. For example, a first end of the first switch and a first end of the second switch may be connected to a line to which the driving voltage VDD is applied. A second end of the first switch may be connected to a first LED group of the BLU 230, and a second end of the second switch may be connected to a second LED group of the BLU 230. Accordingly, when the first switch is closed, the driving voltage VDD may be applied to the first LED group, and when the second switch is closed, the driving voltage VDD may be applied to the second LED group. The LED applied with the driving voltage VDD may emit light based on the pulse modulation signal PMS of the PIC 220. In some embodiments, the switches of the SW 240 may be designed to be closed at the high level of the switch control signal SCTR or closed at the low level of the switch control signal SCTR.

In some embodiments, the PIC 220 may receive the driving voltage VDD according to the opening and closing of the SW 240. For example, when the SW 240 is closed based on the switch control signal SCTR, the driving voltage VDD may be applied to the PIC 220 and the BLU 230, and when the SW 240 is opened, the PIC 220 and the driving voltage VDD may not be applied to the BLU 230.

In some embodiments, the first switch and the second switch may be applied with different driving voltages. That is, the first end of the first switch may be connected to a line to which a first driving voltage is applied, and the first end of the second switch may be connected to a line to which a second driving voltage different from the first driving voltage is applied. The first driving voltage and the second driving voltage may be determined in advance according to characteristics of the image, characteristics of the LED, and a special purpose.

The PDIC 210 may generate a packet PKT based on the backlight data BLD received from the TCON 100. The packet PKT may include timing information and the dimming data. The PDIC 210 may transmit the packet PKT to the PIC 220. A method for transmitting data from the PDIC 210 to the PIC 220 is not limited to packets, the PDIC 210 may transmit the timing information and the dimming data to the PIC 220 using an electrical signal.

In some embodiments, the PDIC 210 may control the timing information to control a time point at which the BLU 230 emits the light LGT, or the PIC 220 may control the time point for emitting the light LGT based on the packet PKT and the opening and closing of the SW 240. That is, the PDIC 210 or the PIC 220 may lag or lead the emission time point of the light LGT.

The PDIC 210 may generate the packet PKT based on the quantity of BLU lines and the quantity of slits of the BLU 230 within one frame. The quantity of slits may indicate the quantity of the subframe periods within one frame. In addition, the quantity of slits may be understood as the number of times the SW 240 are opened and closed or the number of times the BLU 230 alternates through the SW 240, within one frame. For example, when the BLU 230 alternates ten times by opening and closing the first switch and the second switch five times in one frame, the number of slits may be 10. The PDIC 210 may determine a frame display region based on the quantity of BLU lines and the quantity of slits (or the quantity of the subframe periods). In the timing diagram of the BLU 230, the frame display area may have a parallelogram shape. The PDIC 210 may generate the packet PKT based on the frame display region.

In an embodiment, the BLU 230 may include a first BLU line and a second BLU line. The first BLU line and the second BLU line may be a horizontal line, and the first BLU line may be disposed above the second BLU line. The PIC 220 may include a first PIC for controlling the first BLU line and a second PIC for controlling the second BLU line. The PDIC 210 may output a first packet containing first timing information to the first PIC, and output a second packet containing second timing information that is later than the first timing information to the second PIC. The PDIC 210 may generate the first packet and the second packet based on the frame display region. In some embodiments, the PDIC 210 may output a same packet to the first PIC and the second PIC, the first PIC may generate a first pulse modulation signal based on the packet, and the second PIC may generate a second pulse modulation signal that is later than the first pulse modulation signal based on the packet.

The PIC 220 may generate the pulse modulation signal PMS based on the packet PKT. The pulse modulation signal PMS may be a signal for controlling a brightness of the LED and may be generated using an algorithm such as PWM or PAM. For example, the PIC 220 may determine a level transition time point of the pulse modulation signal PMS based on the timing information about the packet PKT.

In an embodiment, the PDIC 210 may be configured to generate the first packet and the second packet such that the first PIC outputs the first pulse modulation signal corresponding to a first frame at a first time point, and the second PIC outputs the second pulse modulation signal corresponding to the first frame or a third pulse modulation signal corresponding to a second frame preceding the first frame at the first time point. When generating the second packet such that the second PIC outputs the third pulse modulation signal at the first time point, the PDIC 210 may be configured to generate the second packet such that the second PIC outputs a fourth pulse modulation signal corresponding to the first frame at a second time point later than the first time point by the predetermined delay.

In addition, the PIC 220 may determine an amplitude or width of the pulse modulation signal PMS based on the dimming data of the packet PKT. The PIC 220 may transmit the pulse modulation signal PMS to the BLU 230.

The BLU 230 may emit light based on the driving voltage VDD and the pulse modulation signal PMS. The PDIC 210 may generate the packet PKT and the switch control signal SCTR such that the time point of applying the driving voltage VDD matches the level transition time point of the pulse modulation signal PMS. That is, the BLU 230 may receive the driving voltage VDD, and may emit light in a period where the pulse modulation signal PMS is a first level (for example, the high level). The BLU 230 may not emit light in a period where the driving voltage VDD is not applied or the pulse modulation signal PMS is a second level (e.g., the low level).

Figure 3:
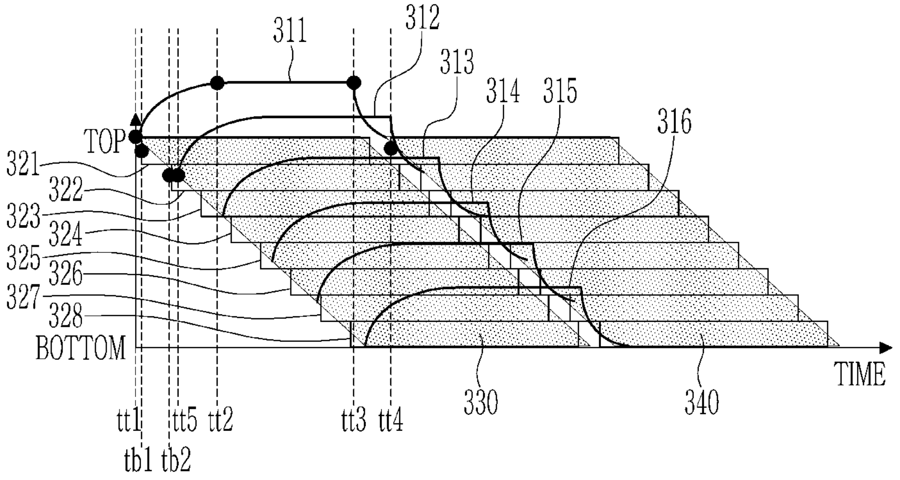
FIG. 3 is a drawing illustrating an operation of a backlight module according to an embodiment.

FIG. 3 is a drawing illustrating an operation of a backlight module according to an embodiment. In FIG. 3, an operation of the backlight module 200 will be described in relation to an operation of the panel 350 of FIG. 1. Referring to FIG. 2 and FIG. 3 together, in the graph, the x-axis represents time, and the y-axis represents the vertical height of the display device. Since the BLU 230 of the backlight module 200 is disposed on the rear surface of the panel 350 in the display device, y-axis may represent a vertical height of the panel 350 and height of the BLU 230.

The panel 350 may receive the light LGT emitted by the backlight module 200 to display the first frame in a display period 330, and may display the second frame in a display period 340. The second frame may be a frame subsequent to the first frame.

The panel 350 may display each frame in the line scan manner. The panel 350 may include pixels connected to a horizontally disposed gate line and a vertically disposed source line. The gate line may receive the scan signal from the driver circuit 300, and the source line may receive the pixel signal from the driver circuit 300. The panel 350 may include a plurality of the gate lines and a plurality of the source lines, and accordingly, may include a plurality of pixels. The pixel may include a transistor and a capacitor. Transistor may be implemented as a thin film transistor (TFT).

The panel 350 may include first to sixth gate lines, and each gate line may include the plurality of pixels. A first gate line may be located uppermost in the panel 350, and remaining gate lines may be located sequentially thereunder. That is, the sixth gate line may be positioned at a lowermost end of the panel 350. Pixels of the first to sixth gate lines may operate based on the scan signal and the pixel signal, and the capacitor included in the pixel may charge and discharge charges as shown in stabilization graphs 311 to 316. For example, a first capacitor of a first pixel of the first gate line may charge and discharge charges as shown in a stabilization graph 311. In order to display the first frame, the first capacitor may start to charge the charges at a time point tt1 based on the scan signal and the pixel signal. The first capacitor may charge the charges from the time point tt1 to a time point tt2, may maintain the charged charge from the time point tt2 to a time point tt3, and may discharge from the time point tt3 to a time point tt4. Accordingly, the first pixel may have a transient response period from the time point tt1 to the time point tt2, may have a stabilization period from the time point tt2 to the time point tt3, and may have a blank period from the time point tt3 to the time point tt4. The blank period may mean a period in which the image is not displayed in order to prepare display of the second frame after the first pixel displays the first frame. The first capacitor may start to charge the charges for displaying the second frame at the time point tt4. Pixels of the second to the sixth gate line may operate in the same manner as the first pixel of the first gate line.

A time point tt5 at which a second pixel of the second gate line starts an operation for displaying the first frame may have a predetermined time delay from the time point tt1 at which the first pixel of the first gate line starts an operation for displaying the first frame. That is, a time point at which the second pixel is triggered may be later than a time point at which the first pixel is triggered. In the same way, since pixels of the third to the sixth gate lines starts operating later than the pixels of the adjacent gate lines in the upper end, the panel 350 may operate in the line scan manner.

The backlight module 200 may operate the BLU 230 in synchronization with the line scan manner of the panel 350.

That is, the LED of the BLU 230 is disposed corresponding to a transistor of the panel 350, and the backlight module 200 may operate such that the BLU 230 emits emit light based on at a time point at which pixels of each gage line of the panel 350 are triggered. For example, the BLU 230 may include first to eighth BLU lines including a plurality of LEDs. The first to eighth BLU lines may be vertically disposed in the BLU 230. For example, the first BLU line may be located uppermost in the BLU 230, and remaining BLU lines may be located sequentially thereunder. That is, eighth BLU line may be positioned at a lowermost end of the BLU 230. The first to eighth BLU lines may operate as shown in each graphs 321 to 328.

The first to eighth BLU lines of the BLU 230 may emit light based on the driving voltage VDD applied through the SW 240 and the pulse modulation signal PMS received from the PIC 220. The pulse modulation signal PMS applied to the first to eighth BLU lines may have different level transition time points (for example, a time point of transition from the low level to the high level). The PDIC 210 may generate and output the packet PKT to the PIC 220 such that the BLU 230 operates in the line scan manner. A plurality of PICs 220 may be implemented, and each of the PICs 220 may control brightnesses of different BLU lines. The PDIC 210 may generate different packets PKT for each PIC 220.

The PIC 220 may output the pulse modulation signal PMS to the BLU 230 in response to the packet PKT. For example, the level transition time point of the pulse modulation signal PMS applied to the first BLU line is the earliest, the level transition time point of the pulse modulation signal PMS applied to the second to eighth BLU lines is delayed therefrom by a predetermined delay time, and the level transition time point of the pulse modulation signal PMS applied to the eighth BLU line is the latest. The first BLU line may operate at a time point tb1 as shown in a graph 321 based on the pulse modulation signal PMS. The second BLU line may operate at a time point tb2 as shown in a graph 322 based on the pulse modulation signal PMS. The time point tb2 may have the predetermined time delay than the time point tb1

In the same way, the third to the eighth BLU lines may start operating later than an adjacent BLU line in the upper end. As such, the first to the eighth BLU lines sequentially operate with the predetermined time delay to be synchronized to the line scan manner of the panel 350, and thus the display device 10 may display clear image.

FIG. 3 shows that the panel 350 includes six gate lines, and the BLU 230 include eight lines, but embodiments are not limited thereto, and the panel 350 and the BLU 230 may be implemented to include such lines in various quantities that are the same as or different from the disclosed quantities.

Figure 4:
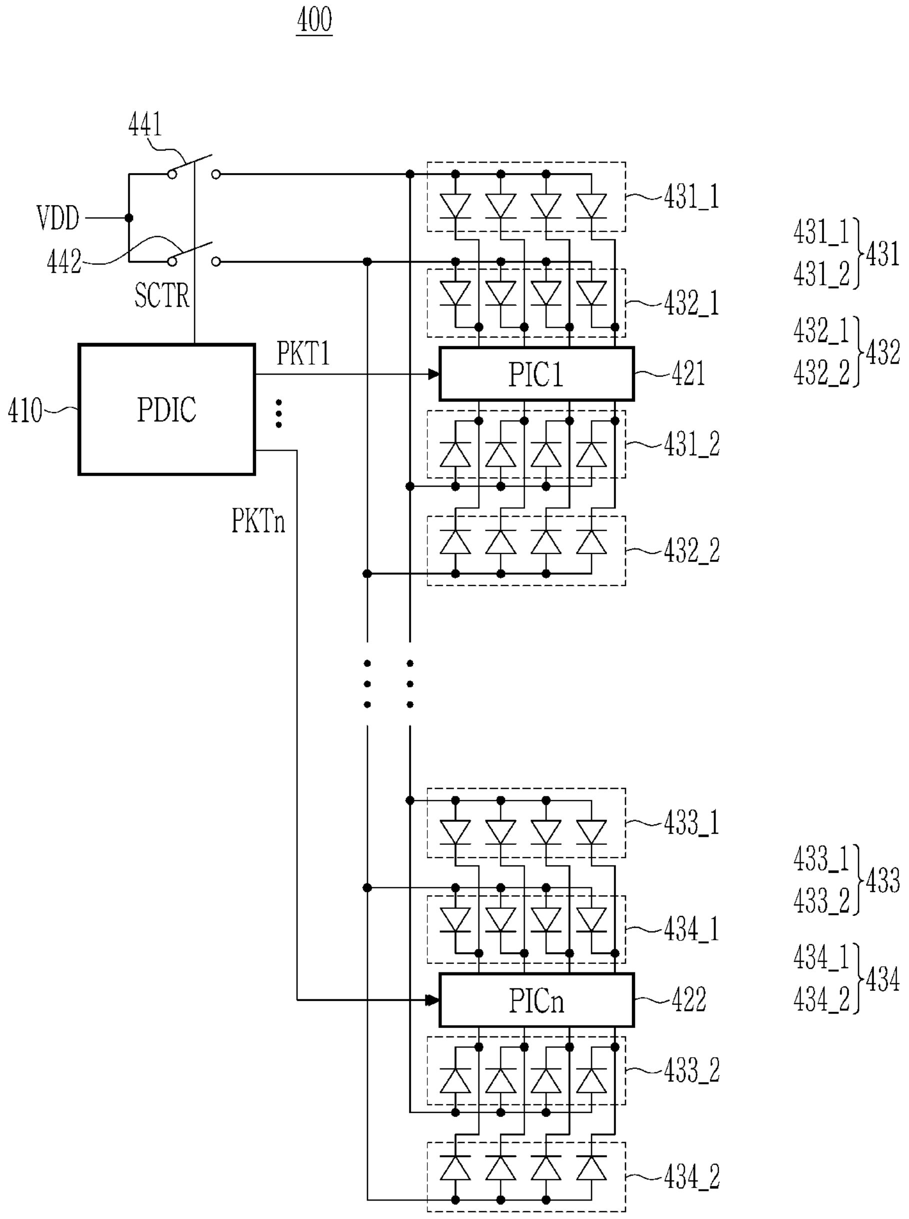
FIG. 4 is a circuit diagram of a backlight module according to an embodiment.
Figure 5:
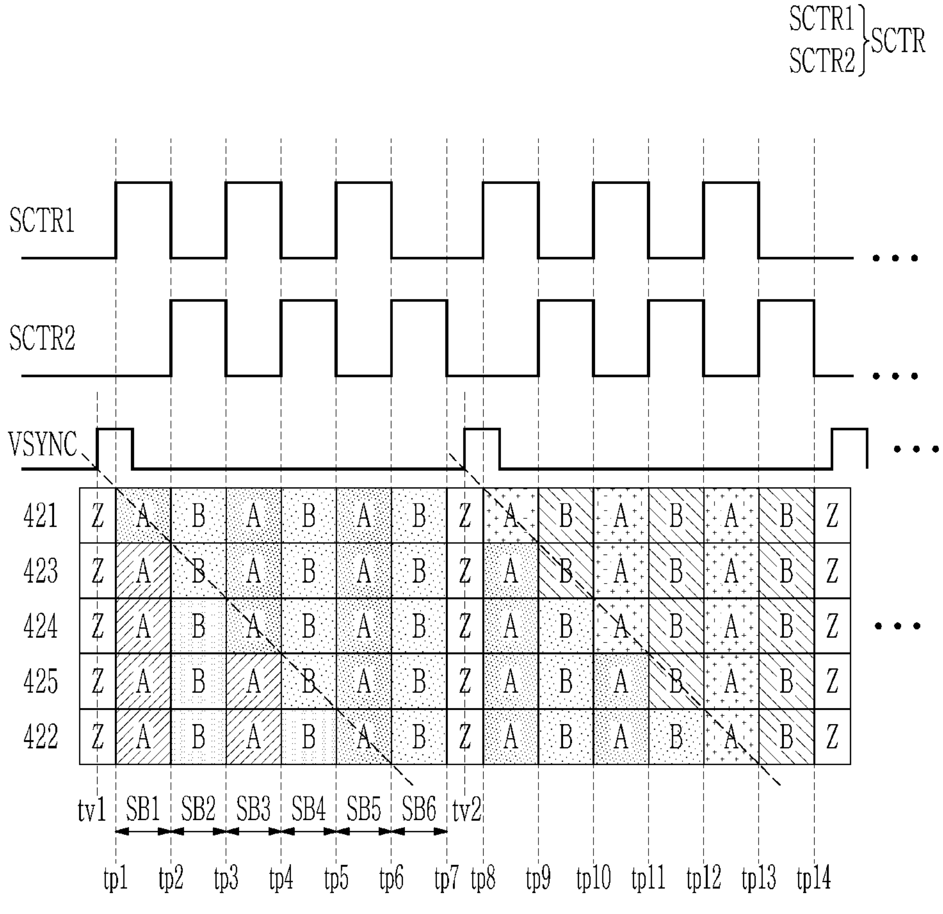
FIG. 5 is a timing diagram illustrating an operation of a pixel integrated circuit (PIC) and switch according to an embodiment.

FIG. 4 is a circuit diagram of a backlight module according to an embodiment. FIG. 5 is a timing diagram illustrating an operation of a PIC and switch according to an embodiment.

Referring to FIG. 4, a backlight module 400 according to an embodiment may include PDIC 410, a plurality of PICs (PIC1-PICn) 421-422, a plurality of BLU lines 431 to 434, and the plurality of switches 441 and 442. The plurality of BLU lines 431 to 434 may be vertically disposed in the backlight module 400, and each of the BLU lines 431 to 434 may include the plurality of LEDs that are horizontally disposed. The plurality of PICs 421 to 422 may control the plurality of BLU lines 431 to 434 that emit light at the rear surface of the panel, in the unit of row.

A PDIC 410 may control brightnesses of the plurality of BLU lines 431 to 434 in the unit of rows by controlling the plurality of PICs 421 to 422 and the plurality of switches 441 and 442. The PDIC 410 may control the plurality of PICs 421 to 422 through the packet PKT1 to PKTn, and control the plurality of switches 441 and 442 through the switch control signal SCTR. A PIC 421 may control brightnesses of BLU lines 431 and 432 among the plurality of BLU lines 431 to 434, and a PIC 422 may control brightnesses of BLU lines 433 and 434 among the plurality of BLU lines 431 to 434.

The BLU line 431_1 and the BLU line 431_2 included in the BLU line 431 may be provided at different locations. A shape in which the BLU line 431_1 and the BLU line 431_2 are disposed may be different in some embodiments. In an embodiment, as shown in FIG. 4, the BLU line 431_1 may be disposed in a first row and the BLU line 431_2 may be disposed in a second row, the first row and the second row may be different rows. In an embodiment, the BLU line 431_1 and the BLU line 431_2 may be horizontally disposed in one row. In an embodiment, between the LEDs of the BLU line 431_1 and the BLU line 431_2, the LED of another BLU line (for example, a BLU line 432) may be disposed. In the same way, each of the BLU lines 432 to 434 may include two BLU lines provided on different positions.

The PICs 421 to 422 may determine the pulse modulation signal based on a shape in which the plurality of BLU lines 431 to 434 are disposed. For example, the PIC 421 may be connected to a plurality of BLU lines 431_1, 431_2, 432_1, and 432_2 disposed in four different rows. The PIC 421 may output the same or different pulse modulation signals to the plurality of BLU lines 431_1, 431_2, 432_1, and 432_2. For example, the PIC 421 may output the pulse modulation signal such that the plurality of BLU lines 431_1, 431_2, 432_1, and 432_2 operate in synchronization with scan time of the panel. Timing control between the BLU line 431 and the BLU line 432 may be possible by opening and closing of the switches 441 and 442 based on the switch control signal SCTR. Timing control between the BLU line 431_1 and the BLU line 431_2 of the BLU line 431 may be based on information about the packet PKT1 received by the PIC 421. The same description may be applied to the BLU line 432.

The switches 441 and 442 may transfer the driving voltage VDD to the plurality of BLU lines 431 to 434 through opening and closing. For example, the driving voltage VDD may be applied from a power source such as a power management integrated circuit (PMIC). The LED included in the plurality of BLU lines 431 to 434 may include a first end connected to the PICs 421 to 422, and a second end connected to the switches 441 and 442.

The switches 441 and 442 may be alternately opened and closed based on the switch control signal SCTR output by the PDIC 410. For example, the PDIC 410 may generate and output different switch control signals SCTR to the switches 441 and 442 such that the switches 441 and 442 are alternately opened and closed.

Also referring to FIG. 5, the PDIC 410 may generate the first switch control signal SCTR1 with respect to a switch 441 and the second switch control signal SCTR2 with respect to a switch 442. "A" may correspond to the first switch control signal SCTR1, "B" may correspond to the second switch control signal SCTR2, and "Z" may correspond to a VSYNC. The operation of the first switch control signal SCTR1 and the second switch control signal SCTR2 may be mutually exclusive within an operation period of one cycle. The operation period of one cycle may refer to a period from a time point tp1 to a time point tp7. For example, when the first switch control signal SCTR1 is the high level, the second switch control signal SCTR2 may be the low level, and when the first switch control signal SCTR1 is the low level, the second switch control signal SCTR2 may be the high level.

The switches 441 and 442 may be alternately opened and closed based on the switch control signal SCTR within an operation period of one cycle. That is, when the switch 441 is opened, the switch 442 may be closed, and when the switch 441 is closed, the switch 442 may be opened. In addition, the plurality of PICs 421 to 425 may output the pulse modulation signal with respect to the first frame or the second frame based on the packet PKT1 to PKTn within an operation period of one cycle. The first frame may be previous frame, and the second frame may be a current frame subsequent to the first frame The PIC 421 may correspond to the BLU lines 431 and 432 disposed on an upper end of the BLU, the PIC 422 may correspond to the BLU lines 433 and 434 disposed on a lower end of the BLU, and PICs 423 to 425 may correspond to the BLU line disposed between the BLU lines 431 and 432 and the BLU lines 433 and 434.

The PDIC 410 may determine a pause period in one frame display period. The PDIC 410 may control the plurality of BLU lines 431 to 434 to identically operate in the pause period. For example, the plurality of BLU lines 431 to 434 may not emit light in the pause period. The PDIC 410 may determine a period from the time point tp7 at which the subframe periods SB1 to SB6 end to a time point tp8 at which a subsequent frame display period starts in one frame display period as the pause period. Accordingly, the switches 441 and 442 and the plurality of PICs 421 to 425 may have the pause period from the time point tp7 to the time point tp8. The PDIC 410 may generate the switch control signal SCTR and the packet PKT1 to PKTn such that the plurality of PICs 421 to 425 perform the same operation in the pause period. For example, in the pause period, the PDIC 410 may output the switch control signal SCTR of the low level, and the switches 441 and 442 may be opened. In addition, in the pause period, the plurality of PICs 421 to 425 may output the pulse modulation signal based on the packet PKT1 to PKTn of the low level.

The PDIC 410 may generate the switch control signal SCTR and the packet PKT1 to PKTn based on the vertical synchronization signal VSYNC. The vertical synchronization signal VSYNC may be included in the backlight data BLD output by the TCON 100 of FIG. 1. The vertical synchronization signal VSYNC may indicate a starting time point of a frame. For example, the TCON 100 may output the vertical synchronization signal VSYNC of the high level at a time point tv1 when the first frame starts, and may output the vertical synchronization signal VSYNC of the high level at a time point tv2 when the second frame subsequent to the first frame starts. The period of the vertical synchronization signal VSYNC may correspond to the frame display period. When the level of the vertical synchronization signal VSYNC transitions at the time point tv1, the PDIC 410 may output the switch control signal SCTR1 of the high level at the time point tp1 that is after the predetermined delay from the time point tv1. In some embodiments, the PDIC 410 may implement the predetermined delay by using the counter, the delay element, and the like.

The PDIC 410 may generate the switch control signal SCTR based on the length of the subframe periods SB1 to SB6. The subframe periods SB1 to SB6 may have the same time length. The subframe period SB1 may be a period from the time point tp1 to a time point tp2, and similar description may be applied to the remaining subframe periods SB2 to SB6. For example, the PDIC 410 may generate switch control signals SCTR1 and SCTR2 having its pulse width as the length of the subframe periods SB1 to SB6. The subframe periods SB1 to SB6 may indicate a period in which the PICs 421 to 425 apply the pulse modulation signal of the high level to each of the BLU lines 431 to 434. The switches 441 and 442 may be closed based on the pulse modulation signal of the first level, and may be opened based on the pulse modulation signal of the second level, in the subframe periods SB1 to SB6. In an embodiment, the first level may be the high level and the second level may be the low level, but embodiments are not limited thereto.

When the switch 441 is closed based on the switch control signal SCTR1 at the time point tp1, the driving voltage VDD may be applied to the BLU lines 431 and 433. The PIC 421 may generate the first pulse modulation signal causing the BLU line 431 to emit light, based on the packet PKT1 output from the PDIC 410. The level of the first pulse modulation signal may transition at the time point tp1 at which the switch 441 is closed. The amplitude or width of the first pulse modulation signal may be determined based on the dimming data of the packet PKT1. At the time point tp1, the PIC 421 may output the first pulse modulation signal with respect to the second frame (current frame), and the BLU line 431 may emit light based on the first pulse modulation signal. In addition, the PIC 422 may generate the second pulse modulation signal causing a BLU line 433 to emit light, based on the packet PKTn output from the PDIC 410. The level of the second pulse modulation signal may transition at the time point tp1 at which the switch 441 is closed. The amplitude or width of the second pulse modulation signal may be determined based on the dimming data of the packet PKTn. At the time point tp1, the PIC 422 may output the second pulse modulation signal with respect to the first frame (previous frame), and the BLU line 433 may emit light based on the second pulse modulation signal. At the time point tp1, because the scan signal or data signal of the second frame is not input to transistors of the panel corresponding to the PICs 422 to 425, the PICs 422 to 425 may output pulse modulation signal with respect to the first frame.

When the switch 442 is closed based on the switch control signal SCTR2 at the time point tp2, the driving voltage VDD may be applied to the BLU lines 432 and 434. The PIC 421 may generate the third pulse modulation signal causing the BLU line 432 to emit light, based on the packet PKT1 output from the PDIC 410. The level of the third pulse modulation signal may transition at the time point tp2 at which the switch 442 is closed. The amplitude or width of the third pulse modulation signal may be determined based on the dimming data of the packet PKT1. At the time point tp2, the PIC 421 may output the third pulse modulation signal with respect to the second frame, and the BLU line 432 may emit light based on the third pulse modulation signal. In addition, the PIC 422 may generate the fourth pulse modulation signal causing a BLU line 434 to emit light, based on the packet PKTn output from the PDIC 410. The level of the fourth pulse modulation signal may transition at the time point tp2 at which the switch 442 is closed. The amplitude or width of the fourth pulse modulation signal may be determined based on the dimming data of the packet PKTn. At the time point tp2, the PIC 422 may output the fourth pulse modulation signal with respect to the first frame (previous frame), and the BLU line 433 may emit light based on the fourth pulse modulation signal. The PIC 422 may output the pulse modulation signal with respect to the first frame a time point tp5, and may output the pulse modulation signal with respect to the second frame from the time point tp5.

The PIC 421 may output the pulse modulation signal with respect to the second frame from the time point tp1 to the time point tp7, and after the pause period, may output the pulse modulation signal with respect to a third frame (subsequent frame of the second frame) from the time point tp8. A PIC 423 may output the pulse modulation signal with respect to the first frame until the time point tp2, may output the pulse modulation signal with respect to the second frame from the time point tp2 to a time point tp9, and may output the pulse modulation signal with respect to the third frame from the time point tp9. As such, because the plurality of PICs 421 to 425 output the pulse modulation signal with respect to a new frame at different time points tp1 to tp5, and the switches 441 and 442 are opened and closed when the plurality of PICs 421 to 425 apply the pulse modulation signal, the backlight module 400 is synchronized to the display operation of the panel by operating in the line scan manner, and therefore display device may display clear image.

FIG. 4 shows that there are two switches 441 and 442, and each of the PICs 421 to 422 controls 16 LEDs, but embodiments are not limited thereto, and it may be understood that the number of the switches 441 and 442 may be increased or decreased, and the number of the LEDs controlled by respective PICs 421 to 422 may also be increased or decreased.

In addition, FIG. 4 and FIG. 5 show the line scan manner in which the panel and the backlight module 400 are driven from top to bottom, but the embodiment is not limited thereto, and it may be understood that the panel and the backlight module 400 are oppositely disposed in structural view point, such that they may be operated in the line scan manner in which the panel is driven from top to bottom and the backlight module 400 is driven from bottom to top.

In some embodiments, the PDIC 410 may generate a packet set including the packet PKT1 to PKTn. The PDIC 410 may transmit the packet set to the plurality of PICs 421 to 422. The PIC 421 may use the packet PKT1 from the packet set, and the PIC 422 may use the packet PKTn from the packet set. Accordingly, the line connecting the PDIC 410 and the plurality of PICs 421 to 422 may be simplified.

Figure 6:
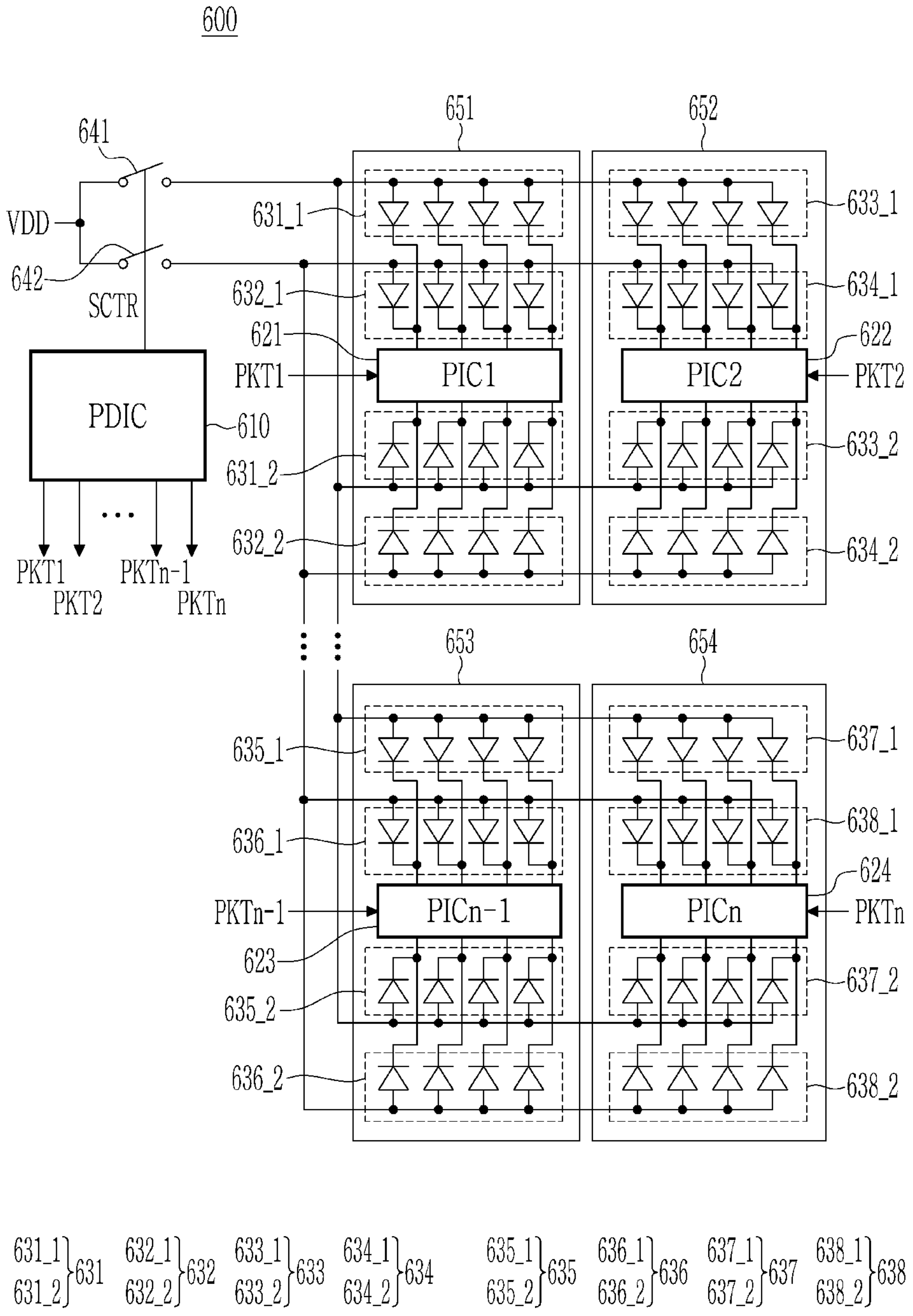
FIG. 6 is a circuit diagram of a backlight module according to an embodiment.
Figure 7:
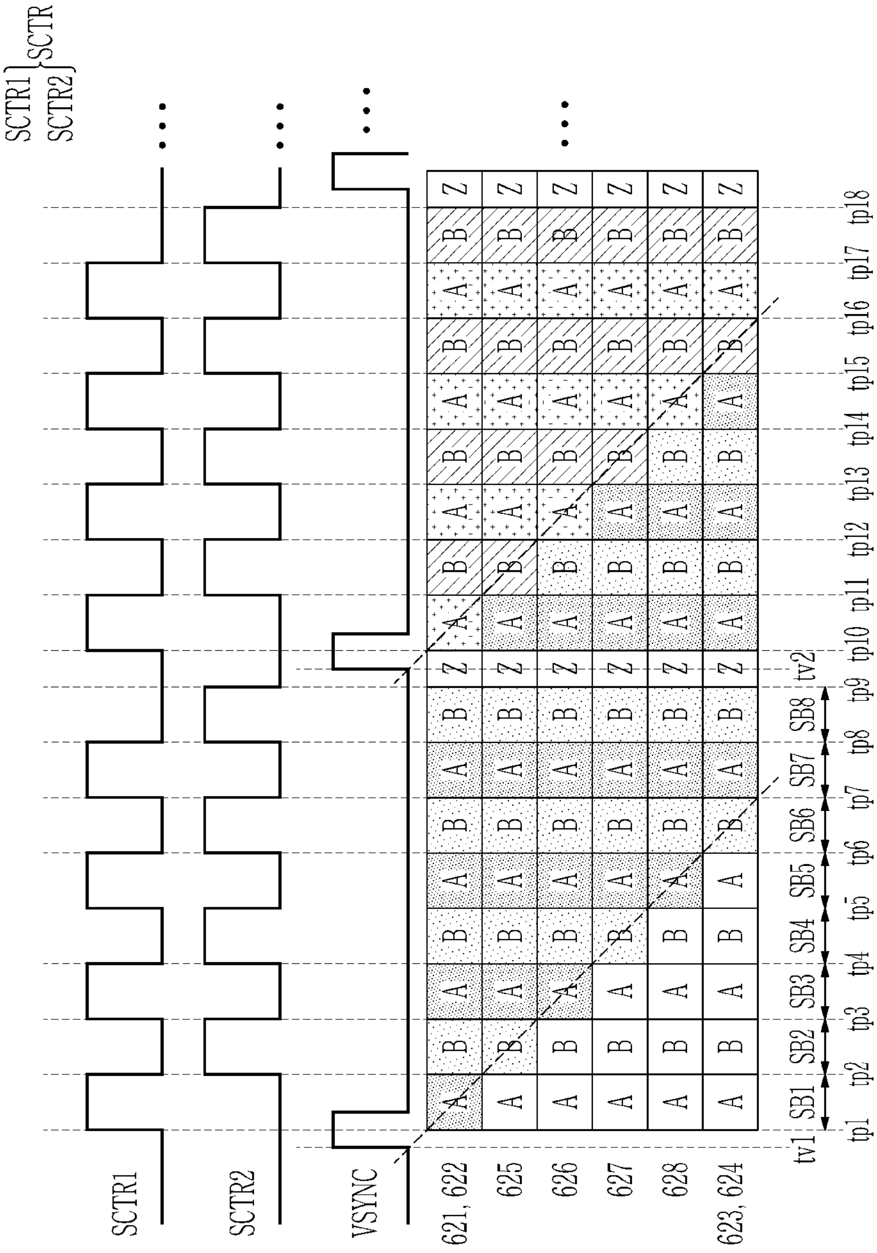
FIG. 7 is a timing diagram illustrating an operation of a PIC and switch according to an embodiment.

FIG. 6 is a circuit diagram of a backlight module according to an embodiment. FIG. 7 is a timing diagram illustrating an operation of a PIC and switch according to an embodiment.

Referring to FIG. 6, a backlight module 600 according to an embodiment may include PDIC 610, the plurality of PICs (PIC1-PICn) 621-624, a plurality of BLU lines 631 to 638, and the plurality of switches 641 and 642. The plurality of BLU lines 631 to 638 may be disposed in a plurality of sections 651 to 654 corresponding to the panel in the backlight module 600, and each of the BLU lines 631 to 638 may include the plurality of LEDs that are horizontally disposed. The plurality of PICs 621 to 624 may control, by section, the plurality of BLU lines 631 to 638 that emit light at the rear surface of the panel.

A PDIC 610 may control brightnesses of the plurality of BLU lines 631 to 638 by sections by controlling the plurality of PICs 621 to 624 and the plurality of switches 641 and 642. The PDIC 610 may control the plurality of PICs 621 to 624 through the packet PKT1 to PKTn, and control the plurality of switches 641 and 642 through the switch control signal SCTR. A PIC 621 may control a brightness of the section 651 by controlling BLU lines 631 and 632 among the plurality of BLU lines 631 to 638. In the same way, PICs 622 to 624 may control brightnesses of the sections 652 to 654 by controlling BLU lines 633 to 638.

The BLU line 631_1 and the BLU line 631_2 included in the BLU line 631 may be provided at different locations. A shape in which the BLU line 631_1 and the BLU line 631_2 are disposed may be different in some embodiments. In an embodiment, as shown in FIG. 6, the BLU line 631_1 may be disposed in a first row and the BLU line 631_2 may be disposed in a second row, the first row and the second row may be different rows. In an embodiment, the BLU line 631_1 and the BLU line 631_2 may be horizontally disposed in one row. In an embodiment, between the LEDs of the BLU line 631_1 and the BLU line 631_2, the LED of another BLU line (for example, a BLU line 632) may be disposed. In the same way, each of the BLU lines 632 to 638 may include two BLU lines being provided different positions. A PIC 621 to 624 may determine the pulse modulation signal based on a shape in which the plurality of BLU lines 631 to 638 are disposed.

The switches 641 and 642 may transfer the driving voltage VDD to the plurality of BLU lines 631 to 638 through opening and closing. For example, the driving voltage VDD may be applied from a power source such as a power management integrated circuit (PMIC). The LED included in the plurality of BLU lines 631 to 638 may include a first end connected to the PIC 621 to 624, and a second end connected to the switches 641 and 642.

The switches 641 and 642 may be alternately opened and closed based on the switch control signal SCTR output by the PDIC 610. For example, the PDIC 610 may generate and output different switch control signals SCTR to the switches 641 and 642 such that the switches 641 and 642 are alternately opened and closed.

Also referring to FIG. 7, the PDIC 610 may generate the first switch control signal SCTR1 with respect to a switch 641 and the second switch control signal SCTR2 with respect to a switch 642. A" may correspond to the first switch control signal SCTR1, "B" may correspond to the second switch control signal SCTR2, and "Z" may correspond to a VSYNC. The first switch control signal SCTR1 and the second switch control signal SCTR2 may be mutually exclusive within an operation period of one cycle. The operation period of one cycle may refer to a period from a time point tp1 to a time point tp9. For example, when the first switch control signal SCTR1 is the high level, the second switch control signal SCTR2 may be the low level, and when the first switch control signal SCTR1 is the low level, the second switch control signal SCTR2 may be the high level.

The switches 641 and 642 may be alternately opened and closed based on the switch control signal SCTR within an operation period of one cycle. That is, when the switch 641 is opened, the switch 642 may be closed, and when the switch 641 is closed, the switch 642 may be opened. In addition, the plurality of PICs 621 to 628 may output the pulse modulation signal with respect to the first frame or the second frame based on the packet PKT1 to PKTn within an operation period of one cycle. The first frame may be previous frame, and the second frame may be a current frame subsequent to the first frame PICs 621 and 622 may correspond to BLU lines 631 to 634 disposed on the upper end of the BLU, PICs 623 and 624 may correspond to BLU lines 635 to 638 disposed on the lower end of the BLU, and PICs 625 to 628 may correspond to the BLU line disposed between the BLU lines 631 to 634 and the BLU lines 635 to 638.

The PDIC 610 may determine a pause period in one frame display period. The PDIC 610 may control the plurality of BLU lines 631 to 638 to identically operate or operated substantially similarly in the pause period. For example, the plurality of BLU lines 631 to 638 may not emit light in the pause period. The PDIC 610 may determine a period from the time point tp9 at which the subframe periods SB1 to SB8 end to the time point tp10 at which a subsequent frame display period starts in one frame display period as the pause period. Accordingly, the switches 641 and 642 and the plurality of PICs 621 to 628 may have the pause period from the time point tp9 to the time point tp10. The PDIC 610 may generate the switch control signal SCTR and the packet PKT1 to PKTn such that the plurality of PICs 621 to 628 perform the same operation in the pause period. For example, in the pause period, the PDIC 610 may output the switch control signal SCTR of the low level, and the switches 641 and 642 may be opened. In addition, in the pause period, the plurality of PICs 621 to 628 may output the pulse modulation signal based on the packet PKT1 to PKTn of the low level.

The PDIC 610 may generate the switch control signal SCTR and the packet PKT1 to PKTn based on the vertical synchronization signal VSYNC. The vertical synchronization signal VSYNC may be included in the backlight data BLD output by the TCON 100 of FIG. 1. The vertical synchronization signal VSYNC may indicate a starting time point of a frame. For example, the TCON 100 may output the vertical synchronization signal VSYNC of the high level at the time point tv1 when the first frame starts, and may output the vertical synchronization signal VSYNC of the high level at the time point tv2 when the second frame subsequent to the first frame starts. The period of the vertical synchronization signal VSYNC may correspond to the frame display period. When the level of the vertical synchronization signal VSYNC transitions at the time point tv1, the PDIC 610 may output the switch control signal SCTR1 of the high level at the time point tp1 that is after the predetermined delay from the time point tv1. In some embodiments, the PDIC 610 may implement the predetermined delay by using the counter, the delay element, and the like.

The PDIC 610 may generate the switch control signal SCTR based on the length of the subframe periods SB1 to SB8. The subframe periods SB1 to SB8 may have the same time length. The subframe period SB1 is a period from the time point tp1 to the time point tp2, and similar description may be applied to the remaining subframe periods SB2 to SB8. For example, the PDIC 610 may generate switch control signals SCTR1 and SCTR2 having its pulse width as the length of the subframe periods SB1 to SB8. The subframe periods SB1 to SB8 may indicate period in which the PICs 621 to 628 apply the pulse modulation signal of the high level to each of the BLU lines 631 to 638. The switches 641 and 642 may be closed based on the pulse modulation signal of the first level, and may be opened based on the pulse modulation signal of the second level, in the subframe periods SB1 to SB8. In an embodiment, the first level may be the high level and the second level may be the low level, but embodiments are not limited thereto.

When the switch 641 is closed based on the switch control signal SCTR1 at the time point tp1, the driving voltage VDD may be applied to the BLU lines 631, 633, 635, and 637. The PIC 621 may generate the first pulse modulation signal causing the BLU line 631 to emit light, based on the packet PKT1 output from the PDIC 610. The level of the first pulse modulation signal may transition at the time point tp1 at which the switch 641 is closed. The amplitude or width of the first pulse modulation signal may be determined based on the dimming data of the packet PKT1. At the time point tp1, the PIC 621 may output the first pulse modulation signal with respect to the second frame (current frame), and the BLU line 631 may emit light based on the first pulse modulation signal.

In addition, at the time point tp1, a PIC 622 may generate the second pulse modulation signal causing a BLU line 633 to emit light, based on the packet PKT2 output from the PDIC 610. The level of the second pulse modulation signal may transition at the time point tp1 at which the switch 641 is closed. The amplitude or width of the second pulse modulation signal may be determined based on the dimming data of the packet PKT2. At the time point tp1, the PIC 622 may output the second pulse modulation signal with respect to the second frame (current frame), and the BLU line 633 may emit light based on the second pulse modulation signal.

The first pulse modulation signal of the PIC 621 and the second pulse modulation signal of the PIC 622 may have different amplitudes or widths. Because the section 651 of the PIC 621 and the section 652 of the PIC 622 correspond to different positions of the image signal received by the display device, a brightness of the section 651 and a brightness of the section 652 may be different from each other. That is, the PDIC 610 may output different packets PKT1 and PKT2 based on the backlight data BLD, and the PICs 621 and 622 may control the sections 651 and 652 in different brightnesses based on the packets PKT1 and PKT2, respectively.

In addition, at the time point tp1, a PIC 623 may generate the third pulse modulation signal causing the BLU line 633 to emit light, based on the packet PKTn−1 output from the PDIC 610. The level of the third pulse modulation signal may transition at the time point tp1 at which the switch 641 is closed. The amplitude or width of the third pulse modulation signal may be determined based on the dimming data of the packet PKTn−1. At the time point tp1, the PIC 623 may output the third pulse modulation signal with respect to the first frame (previous frame), and the BLU line 633 may emit light based on the third pulse modulation signal. At the time point tp1, because the scan signal or data signal of the second frame is not input to transistors of the panel corresponding to the PICs 623 to 628, the PICs 623 to 628 may output the pulse modulation signal with respect to the first frame.

When the switch 642 is closed based on the switch control signal SCTR2 at the time point tp2, the driving voltage VDD may be applied to the BLU lines 632, 634, 636, and 638. The PIC 621 may generate the fourth pulse modulation signal causing the BLU line 632 to emit light, based on the packet PKT1 output from the PDIC 610. The level of the fourth pulse modulation signal may transition at the time point tp2 at which the switch 642 is closed. The amplitude or width of the fourth pulse modulation signal may be determined based on the dimming data of the packet PKT1. At the time point tp2, the PIC 621 may output the fourth pulse modulation signal with respect to the second frame, and the BLU line 632 may emit light based on the fourth pulse modulation signal. The PIC 622 may output a fifth pulse modulation signal with respect to the second frame, and the fifth pulse modulation signal and the fourth pulse modulation signal may have different amplitudes or widths. A BLU line 634 may emit light based on the fifth pulse modulation signal.

In addition, the PIC 623 may generate a sixth pulse modulation signal causing a BLU line 636 to emit light, based on the packet PKTn−1 output from the PDIC 610. The level of the sixth pulse modulation signal may transition at the time point tp2 at which the switch 642 is closed. The amplitude or width of the sixth pulse modulation signal may be determined based on the dimming data of the packet PKTn−1. At the time point tp2, the PIC 623 may output the sixth pulse modulation signal with respect to the first frame (previous frame), and the BLU line 636 may emit light based on the sixth pulse modulation signal. The PIC 623 may output the pulse modulation signal with respect to the first frame a time point tp6, and may output the pulse modulation signal with respect to the second frame from the time point tp6.

The PICs 621 and 622 may output the pulse modulation signal with respect to the second frame from the time point tp1 to the time point tp9, and after the pause period, may output the pulse modulation signal with respect to the third frame (subsequent frame of the second frame) from the time point tp10. The PIC 623 may output the pulse modulation signal with respect to the first frame until the time point tp2, may output the pulse modulation signal with respect to the second frame from the time point tp2 to the time point tp11, and may output the pulse modulation signal with respect to the third frame from the time point tp11. As such, because the plurality of PICs 621 to 628 output the pulse modulation signal with respect to a new frame at different the time point tp1 to tp6, and the switches 641 and 642 are opened and closed when the plurality of PICs 621 to 628 apply the pulse modulation signal, the backlight module 600 may be synchronized to the display operation of the panel by operating the line scan manner. In addition, the backlight module 600 divides the BLU illuminating the panel into the plurality of sections 651 to 654 to separately control the brightness with respect to the sections, and the display device may display clear image.

FIG. 6 shows that there are two switches 641 and 642, and each of the PIC 621 to 624 controls 16 LEDs, but embodiments are not limited thereto, and it may be understood that the number of the switches 641 and 642 may be increased or decreased, and the number of the LEDs controlled by respective PIC 621 to 624 may also be increased or decreased. In addition, the backlight module 600 may further include a pixel circuit in a horizontal direction to implement more detailed LED control.

In addition, FIG. 6 and FIG. 7 show the line scan manner in which the panel and the backlight module 600 are driven from top to bottom, but the embodiment is not limited thereto, and it may be understood that the panel and the backlight module 600 are oppositely disposed in structural view point, such that they may be operated in the line scan manner in which the panel is driven from top to bottom and the backlight module 600 is driven from bottom to top.

In some embodiments, the PDIC 610 may generate a packet set including the packet PKT1 to PKTn. The PDIC 610 may transmit the packet set to the plurality of PICs 621 to 624. The PIC 621 may use the packet PKT1 from the packet set, the PIC 622 may use the packet PKT2 from the packet set, the PIC 623 may use the packet PKTn−1 from the packet set, and a PIC 624 may use the packet PKTn from the packet set. Accordingly, the line connecting the PDIC 610 and the plurality of PICs 621 to 624 may be simplified.

Figure 8:
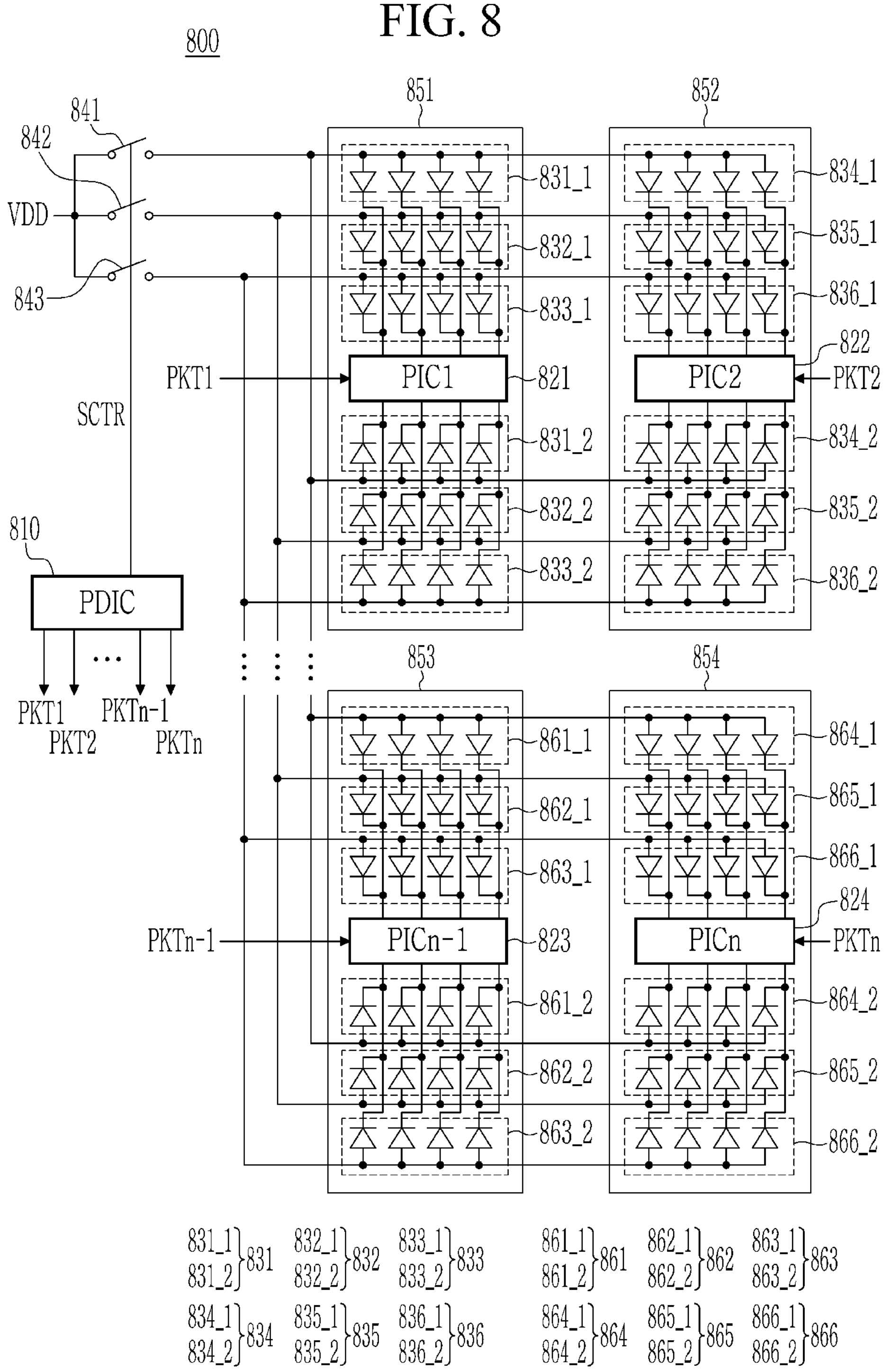
FIG. 8 is a circuit diagram of a backlight module according to an embodiment.
Figure 9:
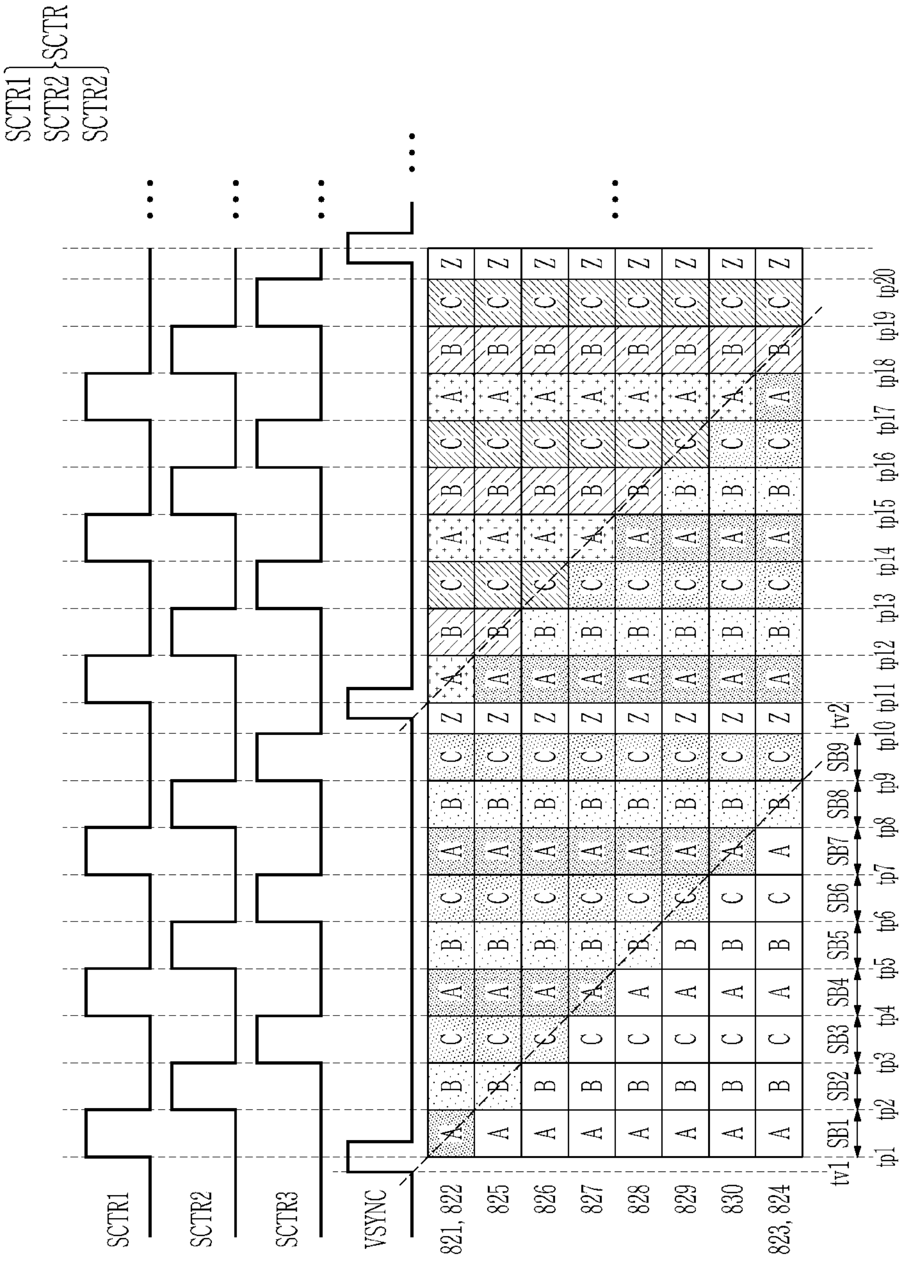
FIG. 9 is a timing diagram illustrating an operation of a PIC and switch according to an embodiment.

FIG. 8 is a circuit diagram of a backlight module according to an embodiment. FIG. 9 is a timing diagram illustrating an operation of a PIC and switch according to an embodiment.

Referring to FIG. 8, a backlight module 800 according to an embodiment may include PDIC 810, the plurality of PICs (PIC1-PICn; 821-824), a plurality of BLU lines 831 to 836 and 861 to 866, and the plurality of switches 841, 842, and 843. The plurality of BLU lines 831 to 836 and 861 to 866 may be disposed in a plurality of sections 851 to 854 corresponding to the panel in the backlight module 800, and each of the BLU lines 831 to 836 and 861 to 866 may include the plurality of LEDs that are horizontally disposed. The plurality of PICs 821 to 824 may control, in the unit of section, the plurality of BLU lines 831 to 836 and 861 to 866 that emit light at the rear surface of the panel.

A PDIC 810 may control brightnesses of the plurality of BLU lines 831 to 836 and 861 to 866 in the unit of sections by controlling the plurality of PICs 821 to 824 and the plurality of switches 841, 842, and 843. The PDIC 810 may control the plurality of PICs 821 to 824 through the packet PKT1 to PKTn, and control the plurality of switches 841, 842, and 843 through the switch control signal SCTR. A PIC 821 may control a brightness of the section 851 by controlling BLU lines 831, 832, and 833 among the plurality of BLU lines 831 to 836 and 861 to 866. In the same way, PICs 822 to 824 may control brightnesses of the sections 852 to 854 by controlling BLU lines 834 to 836 and 861 to 866.

The BLU line 831_1 and the BLU line 831_2 included in the BLU line 831 may be provided at different locations. A shape in which the BLU line 831_1 and the BLU line 831_2 are disposed may be different in some embodiments. In an embodiment, as shown in FIG. 8, the BLU line 831_1 may be disposed in a first row and the BLU line 831_2 may be disposed in a second row, the first row and the second row may be different rows. In an embodiment, the BLU line 831_1 and the BLU line 831_2 may be horizontally disposed in one row. In an embodiment, between the LEDs of the BLU line 831_1 and the BLU line 831_2, the LED of another BLU line (for example, a BLU line 832) may be disposed. In the same way, each of the BLU lines 833 to 836 and 861 to 866 may include two BLU lines being provided on different positions. The PICs 821 to 824 may determine the pulse modulation signal based on a shape in which the plurality of BLU lines 831 to 836 and 861 to 866 are disposed.

The switches 841, 842, and 843 may transfer the driving voltage VDD to the plurality of BLU lines 831 to 836 and 861 to 866 through opening and closing. For example, the driving voltage VDD may be applied from a power source such as a PMIC. The LED included in the plurality of BLU lines 831 to 836 and 861 to 866 may include a first end connected to the PICs 821 to 824, and a second end connected to the switches 841, 842, and 843.

The switches 841, 842, and 843 may be alternately opened and closed based on the switch control signal SCTR output by the PDIC 810. For example, the PDIC 810 may generate and output different switch control signals SCTR to the switches 841, 842, and 843 such that the switches 841, 842, and 843 are alternately opened and closed.

Also referring to FIG. 9, the PDIC 810 may generate the first switch control signal SCTR1 with respect to a switch 841, the second switch control signal SCTR2 with respect to a switch 842, and a third switch control signal SCTR3 with respect to a switch 843. "A" may correspond to the first switch control signal SCTR1, "B" may correspond to the second switch control signal SCTR2, "C" may correspond to the third switch control signal SCTR03, and "Z" may correspond to a VSYNC, The first switch control signal SCTR1, the second switch control signal SCTR2, and the third switch control signal SCTR3 may be mutually exclusive within an operation period of one cycle. The operation period of one cycle may refer to a period from a time point tp1 to a time point tp10. For example, when the first switch control signal SCTR1 is the high level, second and third switch control signals SCTR2 and SCTR3 may be the low level. That is, when one switch control signal is the high level, remaining switch control signals may be the low level.

The switches 841, 842, and 843 may be alternately opened and closed based on the switch control signal SCTR within an operation period of one cycle. The switches 841, 842, and 843 may be sequentially opened and closed with a predetermined sequence. For example, the switch 842 may be closed when the switch 841 is closed and then opened. The switch 843 may be closed when the switch 842 is closed and then opened. That is, one switch may be closed in one subframe period. In addition, the plurality of PICs 821 to 830 may output the pulse modulation signal with respect to the first frame or the second frame based on the packet PKT1 to PKTn within an operation period of one cycle. The first frame may be previous frame, and the second frame may be a current frame subsequent to the first frame PICs 821 and 822 may correspond to the BLU lines 831 to 836 disposed on the upper end of the BLU, PICs 823 and 824 may correspond to BLU lines 861 to 866 disposed on the lower end of the BLU, and PICs 825 to 830 may correspond to the BLU line disposed between the BLU lines 831 to 836 and the BLU lines 861 to 866.

The PDIC 810 may determine a pause period in one frame display period. The PDIC 810 may control the plurality of BLU lines 831 to 836 and 861 to 866 to identically operate in the pause period. For example, the plurality of BLU lines 831 to 836 and 861 to 866 may not emit light in the pause period. The PDIC 810 may determine a period from the time point tp10 at which the subframe periods SB1 to SB9 end to the time point tp11 at which a subsequent frame display period starts in one frame display period as the pause period. Accordingly, the switches 841, 842, and 843 and the plurality of PICs 821 to 830 may have the pause period from the time point tp10 to the time point tp11. The PDIC 810 may generate the switch control signal SCTR and the packet PKT1 to PKTn such that the plurality of PICs 821 to 830 perform the same operation in the pause period. For example, in the pause period, the PDIC 810 may output the switch control signal SCTR of the low level, and the switches 841, 842, and 843 may be opened. In addition, in the pause period, the plurality of PICs 821 to 830 may output the pulse modulation signal based on the packet PKT1 to PKTn of the low level.

The PDIC 810 may generate the switch control signal SCTR and the packet PKT1 to PKTn based on the vertical synchronization signal VSYNC. The vertical synchronization signal VSYNC may be included in the backlight data BLD output by the TCON 100 of FIG. 1. The vertical synchronization signal VSYNC may indicate a starting time point of a frame. For example, the TCON 100 may output the vertical synchronization signal VSYNC of the high level at the time point tv1 when the first frame starts, and may output the vertical synchronization signal VSYNC of the high level at the time point tv2 when the second frame subsequent to the first frame starts. The period of the vertical synchronization signal VSYNC may correspond to the frame display period. When the level of the vertical synchronization signal VSYNC transitions at the time point tv1, the PDIC 810 may output the switch control signal SCTR1 of the high level at the time point tp1 that is after the predetermined delay from the time point tv1. In some embodiments, the PDIC 810 may implement the predetermined delay by using the counter, the delay element, and the like.

The PDIC 810 may generate the switch control signal SCTR based on the length of the subframe periods SB1 to SB9. The subframe periods SB1 to SB9 may have the same time length. The subframe period SB1 is a period from the time point tp1 to the time point tp2, and similar description may be applied to the remaining subframe periods SB2 to SB9. For example, the PDIC 810 may generate switch control signals SCTR1, SCTR2, and SCTR3 having its pulse width as the length of the subframe periods SB1 to SB9. The subframe periods SB1 to SB9 may indicate period in which the PICs 821 to 830 apply the pulse modulation signal of the high level to each of the BLU lines 831 to 836 and 861 to 866. The switches 841, 842, and 843 may be closed based on the pulse modulation signal of the first level, and may be opened based on the pulse modulation signal of the second level, in the subframe periods SB1 to SB9. In an embodiment, the first level may be the high level and the second level may be the low level, but embodiments are not limited thereto.

When the switch 841 is closed based on the switch control signal SCTR1 at the time point tp1, the driving voltage VDD may be applied to the BLU lines 831, 834, 861, and 864. The PIC 821 may generate the first pulse modulation signal causing the BLU line 831 to emit light, based on the packet PKT1 output from the PDIC 810. The level of the first pulse modulation signal may transition at the time point tp1 at which the switch 841 is closed. The amplitude or width of the first pulse modulation signal may be determined based on the dimming data of the packet PKT1. At the time point tp1, the PIC 821 may output the first pulse modulation signal with respect to the second frame (current frame), and the BLU line 831 may emit light based on the first pulse modulation signal.

In addition, at the time point tp1, a PIC 822 may generate the second pulse modulation signal causing a BLU line 834 to emit light, based on the packet PKT2 output from the PDIC 810. The level of the second pulse modulation signal may transition at the time point tp1 at which the switch 841 is closed. The amplitude or width of the second pulse modulation signal may be determined based on the dimming data of the packet PKT2. At the time point tp1, the PIC 822 may output the second pulse modulation signal with respect to the second frame (current frame), and the BLU line 834 may emit light based on the second pulse modulation signal.

The first pulse modulation signal of the PIC 821 and the second pulse modulation signal of the PIC 822 may have different amplitudes or widths. Because the section 851 of the PIC 821 and the section 852 of the PIC 822 correspond to different positions of the image signal received by the display device, a brightness of the section 851 and a brightness of the section 852 may be different from each other. That is, the PDIC 810 may output different the packets PKT1 and PKT2 based on the backlight data BLD, and the PICs 821 and 822 may control the sections 851 and 852 in different brightnesses, respectively based on the packets PKT1 and PKT2.

In addition, at the time point tp1, a PIC 823 may generate the third pulse modulation signal causing a BLU line 861 to emit light, based on the packet PKTn−1 output from the PDIC 810. The level of the third pulse modulation signal may transition at the time point tp1 at which the switch 841 is closed. The amplitude or width of the third pulse modulation signal may be determined based on the dimming data of the packet PKTn−1. At the time point tp1, the PIC 823 may output the third pulse modulation signal with respect to the first frame (previous frame), and the BLU line 861 may emit light based on the third pulse modulation signal. At the time point tp1, because the scan signal or data signal of the second frame is not input to a transistors of the panel corresponding to the PIC 823 to 830, the PIC 823 to 830 may output the pulse modulation signal with respect to the first frame.

When the switch 842 is closed based on the switch control signal SCTR2 at the time point tp2, the driving voltage VDD may be applied to the BLU lines 832, 835, 862, and 865. The PIC 821 may generate the fourth pulse modulation signal causing the BLU line 832 to emit light, based on the packet PKT1 output from the PDIC 810. The level of the fourth pulse modulation signal may transition at the time point tp2 at which the switch 842 is closed. The amplitude or width of the fourth pulse modulation signal may be determined based on the dimming data of the packet PKT1. At the time point tp2, the PIC 821 may output the fourth pulse modulation signal with respect to the second frame, and the BLU line 832 may emit light based on the fourth pulse modulation signal. The PIC 822 may output the fifth pulse modulation signal with respect to the second frame, and the fifth pulse modulation signal and the fourth pulse modulation signal may have different amplitudes or widths. A BLU line 835 may emit light based on the fifth pulse modulation signal.

In addition, the PIC 823 may generate the sixth pulse modulation signal causing a BLU line 862 to emit light, based on the packet PKTn−1 output from the PDIC 810. The level of the sixth pulse modulation signal may transition at the time point tp2 at which the switch 842 is closed. The amplitude or width of the sixth pulse modulation signal may be determined based on the dimming data of the packet PKTn−1. At the time point tp2, the PIC 823 may output the sixth pulse modulation signal with respect to the first frame (previous frame), and the BLU line 862 may emit light based on the sixth pulse modulation signal. The PIC 823 may output the pulse modulation signal with respect to the first frame the time point tp8, and may output the pulse modulation signal with respect to the second frame from the time point tp8.

When the switch 843 is closed based on the switch control signal SCTR3 at a time point tp3, the driving voltage VDD may be applied to the BLU lines 833, 836, 863, and 866. The PIC 821 may generate a seventh pulse modulation signal causing a BLU line 833 to emit light, based on the packet PKT1 output from the PDIC 810. The level of the seventh pulse modulation signal may transition at the time point tp3 at which the switch 843 is closed. The amplitude or width of the seventh pulse modulation signal may be determined based on the dimming data of the packet PKT1. At the time point tp3, the PIC 821 may output the seventh pulse modulation signal with respect to the second frame, and the BLU line 833 may emit light based on the seventh pulse modulation signal. The PIC 822 may output an eighth pulse modulation signal with respect to the second frame, and the eighth pulse modulation signal and the seventh pulse modulation signal may have different amplitudes or widths. A BLU line 836 may emit light based on the eighth pulse modulation signal.

In addition, the PIC 823 may generate a ninth pulse modulation signal causing a BLU line 863 to emit light, based on the packet PKTn−1 output from the PDIC 810. The level of the ninth pulse modulation signal may transition at the time point tp3 at which the switch 843 is closed. The amplitude or width of the ninth pulse modulation signal may be determined based on the dimming data of the packet PKTn−1. At the time point tp3, the PIC 823 may output the ninth pulse modulation signal with respect to the first frame (previous frame), and the BLU line 863 may emit light based on the ninth pulse modulation signal. The PIC 823 may output the pulse modulation signal with respect to the first frame the time point tp8, and may output the pulse modulation signal with respect to the second frame from the time point tp8.

The PICs 821 and 822 may output the pulse modulation signal with respect to the second frame from the time point tp1 to the time point tp10, and after the pause period, may output the pulse modulation signal with respect to the third frame (subsequent frame of the second frame) from the time point tp11. A PIC 825 may output the pulse modulation signal with respect to the first frame until the time point tp2, may output the pulse modulation signal with respect to the second frame from the time point tp2 to the time point tp12, and may output the pulse modulation signal with respect to the third frame from the time point tp12. As such, because the plurality of PICs 821 to 830 output the pulse modulation signal with respect to a new frame at different the time point tp1 to tp8, and the switches 841, 842, and 843 are opened and closed when the plurality of PICs 821 to 830 apply the pulse modulation signal, the backlight module 800 may be synchronized to the display operation of the panel by operating the line scan manner. In addition, the backlight module 800 may divide the BLU illuminating the panel into the plurality of sections 851 to 854 to separately control the brightness with respect to the sections, and the display device may display clear image.

FIG. 8 shows that there are three switches 841, 842, and 843, and each of the PICs 821 to 824 controls 24 LEDs, but embodiments are not limited thereto, and it may be understood that the number of the switches 841, 842, and 843 may be increased or decreased, and the number of the LEDs controlled by respective PICs 821 to 824 may also be increased or decreased. In addition, the backlight module 800 may further include a pixel circuit in the horizontal direction to implement more detailed LED control. In addition, the opening and closing sequence of the switches 841, 842, and 843 may also be implemented differently from FIG. 8 and FIG. 9.

In addition, FIG. 8 and FIG. 9 show the line scan manner in which the panel and the backlight module 800 are driven from top to bottom, but the embodiment is not limited thereto, and it may be understood that the panel and the backlight module 800 are oppositely disposed in structural view point, such that they may be operated in the line scan manner in which the panel is driven from top to bottom and the backlight module 800 is driven from bottom to top.

In some embodiments, the PDIC 810 may generate a packet set including the packet PKT1 to PKTn. The PDIC 810 may transmit the packet set to the plurality of PICs 821 to 824. The PIC 821 may use the packet PKT1 from the packet set, the PIC 822 may use the packet PKT2 from the packet set, the PIC 823 may use the packet PKTn−1 from the packet set, and a PIC 824 may use the packet PKTn from the packet set. Accordingly, the line connecting the PDIC 810 and the plurality of PICs 821 to 824 may be simplified.

Figure 10:
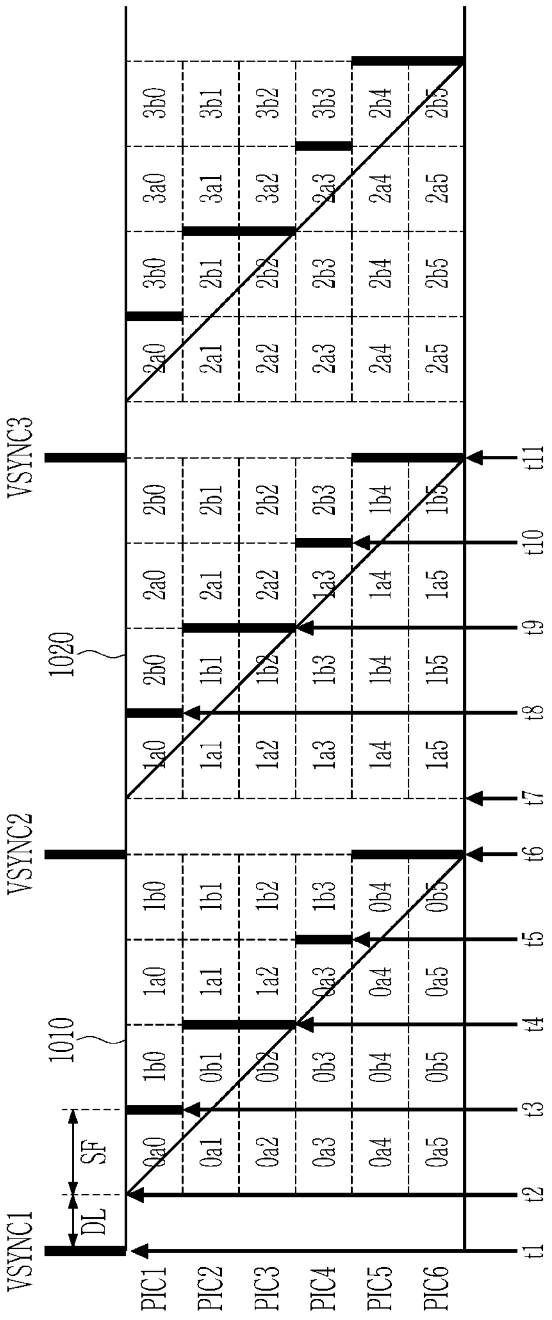
FIG. 10 is a diagram illustrating an operation of a pixel driver integrated circuit (PDIC) and a PIC according to an embodiment.

FIG. 10 is a diagram illustrating an operation of a PDIC and a PIC according to an embodiment.

Referring to FIG. 10, a backlight module according to an embodiment may include PDIC, two switches, and the plurality of PICs PIC1 to PIC6. The PDIC may control two switches and the plurality of PICs PIC1 to PIC6. For example, PDIC may generate a switch control signal for controlling opening and closing of the two switches and a packet for controlling the plurality of PICs PIC1 to PIC6. Two switches may be alternately opened and closed based on the switch control signal. The plurality of PICs PIC1 to PIC6 may generate the pulse modulation signal for controlling a brightness of the BLU line based on different packets. BLU line may include the plurality of LEDs that are horizontally disposed.

The PDIC may determine the frame display regions 1010 and 1020 based on the quantity of slits and the quantity of BLU lines. The quantity of slits may be the number of times the two switches are opened and closed within one frame. In FIG. 10, each switch may be opened and closed two times, and accordingly, the quantity of slits may be 4. The quantity of BLU lines may be the quantity of LED lines in one row corresponding to the panel. In FIG. 10, each of the PICs PIC1 to PIC6 may control a brightness of one BLU line, where the quantity of BLU lines may be 6. PDIC may determine a time table as shown in FIG. 10 based on the quantity of slits and the quantity of BLU lines, and determine the frame display regions 1010 and 1020 based on the line scan time point of the panel.

PDIC may receive vertical synchronization signals VSYNC1 to VSYNC3 at time points t1, t6, and t11. The vertical synchronization signals VSYNC1 to VSYNC3 may be received from the outside (for example, a TCON). The vertical synchronization signals VSYNC1 to VSYNC3 may correspond to the first to third frames, respectively. The first to third frames may be continuous frames.

PDIC may generate packets in response to the vertical synchronization signal VSYNC1 such that the BLU lines emit light in different brightnesses corresponding to the first frame. The packet may include the timing information and the dimming data. The PDIC may generate the timing information such that the plurality of PICs PIC1 to PIC6 control the light emitting time point of the BLU lines in synchronization with the line scan manner of the panel. The PDIC may generate the dimming data such that the plurality of PICs PIC1 to PIC6 control light emission intensity of the BLU lines based on the brightness information about the image.

The PDIC may generate packet based on the frame display regions 1010 and 1020. For example, the PDIC may generate the packets such that the PIC PIC1 outputs the pulse modulation signal of the first frame from a time point t3, the PICs PIC2 and PIC3 output the pulse modulation signal of the first frame from a time point t4, the PIC PIC4 outputs the pulse modulation signal of the first frame from a time point t5, and the PICs PIC5 and PIC6 output the pulse modulation signal of the first frame from a time point t6. In some embodiments, PDIC may transmit the same packet to the plurality of PICs PIC1 to PIC6, and each of the PICs PIC1 to PIC6 may output the pulse modulation signal based on the frame display region. The frame display region may be determined according to the opening and closing state of the switch and the timing information about the packet.

PDIC may operate the plurality of PICs PIC1 to PIC6 at the time point t2 after the predetermined delay DL from the time point t1 of receiving the vertical synchronization signal VSYNC1. In the same way, PDIC may operate the plurality of PICs PIC1 to PIC6 after the predetermined delay from the time points t7 and t11 of receiving the vertical synchronization signals VSYNC2 and VSYNC3. The PDIC may implement the delay by using the counter, the delay element, and the like.

The PDIC may output the switch control signal such that the two switches are alternately opened and closed at the time points t2-t6 and t7-t11 at which the plurality of PICs PIC1 to PIC6 output the pulse modulation signal. For example, the PDIC may open and close the first switch through the first switch control signal, and may open and close the second switch through the second switch control signal. The first switch may be closed in periods t2-t3, t4-t5, t7-t8, and t9-t10, and may be opened in periods t3-t4, t5-t6, t8-t9, and t10-*t*11. The second switch may operate opposite to the first switch. The first switch and the second switch may be opened and closed with a cycle period of the length of the subframe period SF.

The PDIC may transmit the packets to the plurality of PICs PIC1 to PIC6. The plurality of PICs PIC1 to PIC6 may control brightnesses of the BLU lines based on the packets. For example, the PIC PIC1 may output the pulse modulation signal 1*b*0 with respect to the first frame from the time point t3. The PIC PIC1 may output the pulse modulation signal 1*a*0 with respect to the first frame from the time point t4 that is after the length of the subframe period SF. The BLU line receiving the pulse modulation signal 1*b*0 may be connected to the second switch, and the BLU line receiving the pulse modulation signal 1*a*0 may be connected to the first switch. In an embodiment, when the first frame is not an initial frame of the image, the plurality of PICs PIC1 to PIC6 may output the pulse modulation signals 0*a*0-0*a*5 of a previous frame of the first frame before the time point t3.

In addition, the PICs PIC2 and PIC3 may output the pulse modulation signals 1*a*1 and 1*a*2 with respect to the first frame from the time point t4. The PIC PIC4 may output the pulse modulation signal 1*b*3 with respect to the first frame from the time point t5. The PICs PIC5 and PIC6 may output the pulse modulation signals 1*a*4 and 1*a*5 with respect to the first frame from a time point t7 after the pause period.

The plurality of PICs PIC1 to PIC6 and two switches are operated from the time point t2 to the time point t6 according to the control of the PDIC, and then may have the pause period from the time point t6 to the time point t7. The PDIC may perform control such that, in the pause period, the plurality of PICs PIC1 to PIC6 do not output the pulse modulation signal, and the two switches are opened. That is, BLU lines may not emit light in the pause period.

In the same way as in the vertical synchronization signal VSYNC1, the PDIC may, upon receiving the vertical synchronization signal VSYNC2 corresponding to the second frame, generate the packets such that the plurality of PICs PIC1 to PIC6 output the pulse modulation signals 2*a*0-2*a*5 and 2*b*0-2*b*5 corresponding to the second frame from time points t8-t11. As such, the PDIC operates the BLU lines in synchronization with the line scan manner of the panel, and thereby the display device may display clear image.

Figure 11:
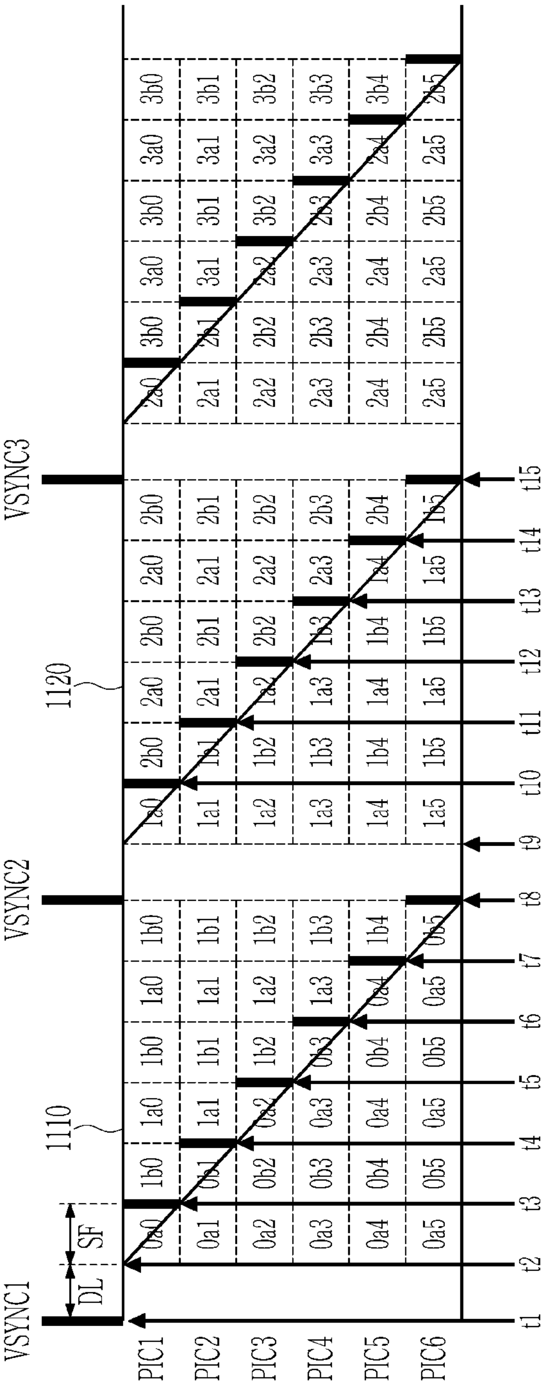
FIG. 11 is a diagram illustrating an operation of a PDIC and a PIC according to an embodiment.

FIG. 11 is a diagram illustrating an operation of a PDIC and a PIC according to an embodiment.

Referring to FIG. 11, a backlight module according to an embodiment may include a PDIC, two switches, and the plurality of PICs PIC1 to PIC6. The PDIC may control two switches and the plurality of PICs PIC1 to PIC6. For example, the PDIC may generate a switch control signal for controlling opening and closing of the two switches and a packet for controlling the plurality of PICs PIC1 to PIC6. Two switches may be alternately opened and closed based on the switch control signal. The plurality of PICs PIC1 to PIC6 may generate the pulse modulation signal for controlling brightnesses of the BLU line based on different packets. The BLU line may include the plurality of LEDs that are horizontally disposed.

The PDIC may determine the frame display regions 1110 and 1120 based on the quantity of slits and the quantity of BLU lines. The quantity of slits may be the number of times the two switches are opened and closed within one frame. In FIG. 11, each switch may be opened and closed three times, and accordingly, the quantity of slits may be 6. The quantity of BLU lines may be the quantity of LED lines in one row corresponding to the panel. In FIG. 11, each of the PICs PIC1 to PIC6 may control a brightness of one BLU line, where the quantity of BLU lines may be 6. The PDIC may determine a time table as shown in FIG. 11 based on the quantity of slits and the quantity of BLU lines, and determine the frame display regions 1110 and 1120 based on the line scan time point of the panel.

The PDIC may receive vertical synchronization signals VSYNC1 to VSYNC3 at time points t1, t8, and t15. The vertical synchronization signals VSYNC1 to VSYNC3 may be received from the outside (for example, a TCON). The vertical synchronization signals VSYNC1 to VSYNC3 may correspond to the first to third frames, respectively. The first to third frames may be continuous frames.

The PDIC may generate packets in response to the vertical synchronization signal VSYNC1 such that the BLU lines emit light in different brightnesses corresponding to the first frame. The packet may include the timing information and the dimming data. The PDIC may generate the timing information such that the plurality of PICs PIC1 to PIC6 control the light emitting time point of the BLU lines in synchronization with the line scan manner of the panel. The PDIC may generate the dimming data such that the plurality of PICs PIC1 to PIC6 control light emission intensity of the BLU lines based on the brightness information about the image.

The PDIC may generate packet based on the frame display regions 1110 and 1120. For example, the plurality of PICs PIC1 to PIC6 may generate the packet to output the pulse modulation signal of the first frame from the time points t3-t8. In some embodiments, the PDIC may transmit the same packet to the plurality of PICs PIC1 to PIC6, and each of the PICs PIC1 to PIC6 may output the pulse modulation signal based on the frame display regions 1110 and 1120. The frame display regions 1110 and 1120 may be determined according to the opening and closing state of the switch and the timing information about the packet.

The PDIC may operate the plurality of PICs PIC1 to PIC6 at the time point t2 after the predetermined delay DL from the time point t1 of receiving the vertical synchronization signal VSYNC1. In the same way, the PDIC may operate the plurality of PICs PIC1 to PIC6 after the predetermined delay from the time points t8 and t15 of receiving the vertical synchronization signals VSYNC2 and VSYNC3. The PDIC may implement the delay by using the counter, the delay element, and the like.

The PDIC may output the switch control signal such that the two switches are alternately opened and closed at the time points t2-t8 and t9-t15 at which the plurality of PICs PIC1 to PIC6 output the pulse modulation signal. For example, the PDIC may open and close the first switch through the first switch control signal, and may open and close the second switch through the second switch control signal. The first switch may be closed in periods t2-t3, t4-t5, t6-t7, t9-t10, t11-t12, and t13-t14, and may be opened in periods t3-t4, t5-t6, t7-t8, t10-t11, t12-t13, and t14-t15. The second switch may operate opposite to the first switch. The first switch and the second switch may be opened and closed with a cycle period of the length of the subframe period SF.

The PDIC may transmit the packets to the plurality of PICs PIC1 to PIC6. The plurality of PICs PIC1 to PIC6 may control brightnesses of the BLU lines based on the packets. For example, the PIC PIC1 may output the pulse modulation signal 1*b*0 with respect to the first frame from the time point t3. The PIC PIC1 may output the pulse modulation signal 1*a*0 with respect to the first frame from the time point t4 that is after the length of the subframe period SF. The BLU line receiving the pulse modulation signal 1*b*0 may be connected to the second switch, and the BLU line receiving the pulse modulation signal 1*a*0 may be connected to the first switch. In an embodiment, when the first frame is not an initial frame of the image, the plurality of PICs PIC1 to PIC6 may output the pulse modulation signals 0*a*0-0*a*5 and 0*b*1-0*b*5 of a previous frame of the first frame before the time point t3. In addition, PICs PIC2 to PIC6 may output the pulse modulation signals 1*a*1, 1*b*2, 1*a*3, 1*b*4, and 1*a*5 with respect to the first frame from different time points t4-t8, respectively.

The plurality of PICs PIC1 to PIC6 and two switches may be operated from the time point t2 to the time point t8 according to the control of the PDIC, and then may have the pause period from the time point t8 to a time point t9. The PDIC may perform control such that, in the pause period, the plurality of PICs PIC1 to PIC6 do not output the pulse modulation signal, and the two switches are opened. That is, BLU lines may not emit light in the pause period.

In a similar manner as in the vertical synchronization signal VSYNC1, the PDIC may, upon receiving the vertical synchronization signal VSYNC2 corresponding to the second frame, generate the packets such that the plurality of PICs PIC1 to PIC6 output the pulse modulation signals 2*a*0-2*a*5 and 2*b*0-2*b*5 corresponding to the second frame from the time points t10-*t*15.

As such, the PDIC may operate the BLU lines in synchronization with the line scan manner of the panel, and thereby the display device may display clear image.

Figure 12:
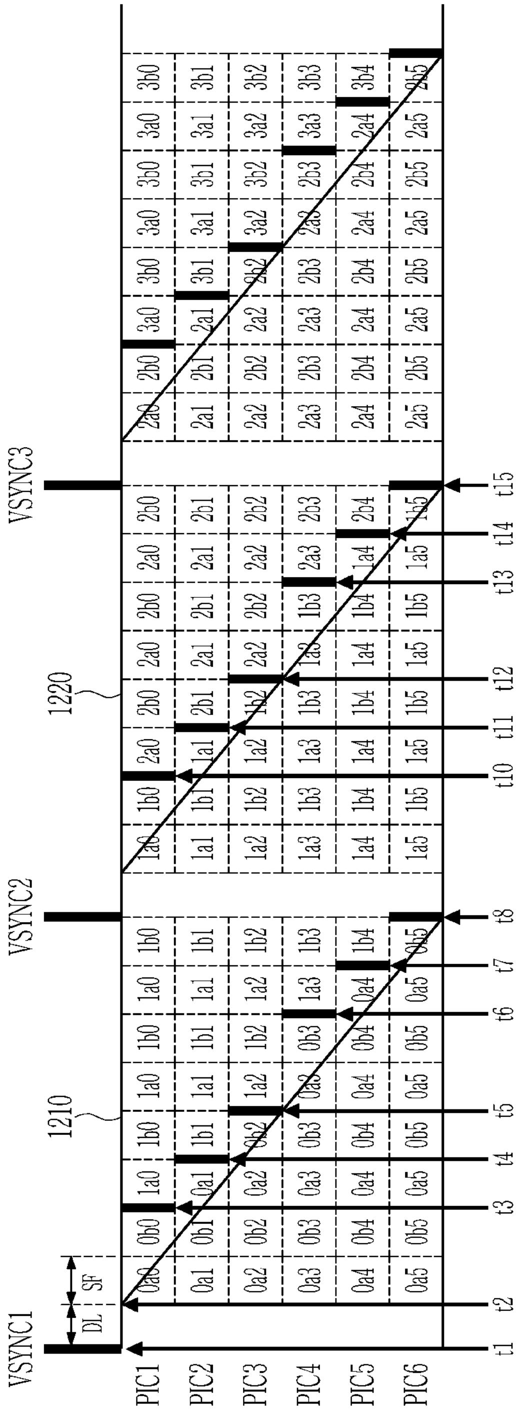
FIG. 12 is a diagram illustrating an operation of a PDIC and a PIC according to an embodiment.

FIG. 12 is a diagram illustrating an operation of a PDIC and a PIC according to an embodiment.

Referring to FIG. 12, a backlight module according to an embodiment may include a PDIC, two switches, and the plurality of PICs PIC1 to PIC6. The PDIC may control two switches and the plurality of PICs PIC1 to PIC6. For example, the PDIC may generate a switch control signal for controlling opening and closing of the two switches and a packet for controlling the plurality of PICs PIC1 to PIC6. Two switches may be alternately opened and closed based on the switch control signal. The plurality of PICs PIC1 to PIC6 may generate the pulse modulation signal for controlling a brightness of the BLU line based on different packets. BLU line may include the plurality of LEDs that are horizontally disposed.

The PDIC may determine the frame display regions 1210 and 1220 based on the quantity of slits and the quantity of BLU lines. The quantity of slits may be the number of times the two switches are opened and closed within one frame. In FIG. 12, each switch may be opened and closed four times, and accordingly, the quantity of slits may be 8. The quantity of BLU lines may be the quantity of LED lines in one row corresponding to the panel. In FIG. 12, each of the PICs PIC1 to PIC6 may control a brightness of one BLU line, where the quantity of BLU lines may be 6. The PDIC may determine a time table as shown in FIG. 12 based on the quantity of slits and the quantity of BLU lines, and determine the frame display regions 1210 and 1220 based on the line scan time point of the panel.

The PDIC may receive vertical synchronization signals VSYNC1 to VSYNC3 at time points t1, t8, and t15. The vertical synchronization signals VSYNC1 to VSYNC3 may be received from the outside (for example, a TCON). The vertical synchronization signals VSYNC1 to VSYNC3 may correspond to the first to third frames, respectively. The first to third frames may be continuous frames.

The PDIC may generate packets in response to the vertical synchronization signal VSYNC1 such that the BLU lines emit light in different brightnesses corresponding to the first frame. The packet may include the timing information and the dimming data. The PDIC may generate the timing information such that the plurality of PICs PIC1 to PIC6 control the light emitting time point of the BLU lines in synchronization with the line scan manner of the panel. The PDIC may generate the dimming data such that the plurality of PICs PIC1 to PIC6 control light emission intensity of the BLU lines based on the brightness information about the image.

The PDIC may generate packet based on the frame display regions 1210 and 1220. For example, the plurality of PICs PIC1 to PIC6 may generate the packet to output the pulse modulation signal of the first frame from the time points t3-t8. In some embodiments, the PDIC may transmit the same packet to the plurality of PICs PIC1 to PIC6, and each of the PICs PIC1 to PIC6 may output the pulse modulation signal based on the frame display regions 1210 and 1220. The frame display regions 1210 and 1220 may be determined according to the opening and closing state of the switch and the timing information about the packet.

The PDIC may operate the plurality of PICs PIC1 to PIC6 at the time point t2 after the predetermined delay DL from the time point t1 of receiving the vertical synchronization signal VSYNC1. In the same way, the PDIC may operate the plurality of PICs PIC1 to PIC6 after the predetermined delay from the time points t8 and t15 of receiving the vertical synchronization signals VSYNC2 and VSYNC3. The PDIC may implement the delay by using the counter, the delay element, and the like.

The PDIC may output the switch control signal such that the two switches are alternately opened and closed at the time points t2-t8 and t9-t15 at which the plurality of PICs PIC1 to PIC6 output the pulse modulation signal. For example, the PDIC may open and close the first switch through the first switch control signal, and may open and close the second switch through the second switch control signal. The first switch and the second switch may be alternately opened and closed in the period t2-t8. The first switch and the second switch may be opened and closed with a cycle period of the length of the subframe period SF.

The PDIC may transmit the packets to the plurality of PICs PIC1 to PIC6. The plurality of PICs PIC1 to PIC6 may control brightnesses of the BLU lines based on packets. For example, the PIC PIC1 may output the pulse modulation signal 1*a*0 with respect to the first frame from the time point t3. The PIC PIC1 may output the pulse modulation signal 1*b*0 with respect to the first frame from the time point t4 that is after the length of the subframe period SF. The BLU line receiving the pulse modulation signal 1*b*0 may be connected to the second switch, and the BLU line receiving the pulse modulation signal 1*a*0 may be connected to the first switch. In an embodiment, when the first frame is not an initial frame of the image, the plurality of PICs PIC1 to PIC6 may output the pulse modulation signals 0*a*0-0*a*5 and 0*b*1-0*b*5 of a previous frame of the first frame before the time point t3. In addition, the PICs PIC2 to PIC6 may output the pulse modulation signals 1*b*1, 1*a*2, 1*a*3, 1*b*4, and 1*a*5 with respect to the first frame from different time points t4-t8, respectively.

The plurality of PICs PIC1 to PIC6 and two switches are operated from the time point t2 to the time point t8 according to the control of the PDIC, and then may have the pause period from the time point t8 to the time point t9. The PDIC may perform control such that, in the pause period, the plurality of PICs PIC1 to PIC6 do not output the pulse modulation signal, and the two switches are opened. That is, BLU lines may not emit light in the pause period.

In the similar manner as in the vertical synchronization signal VSYNC1, the PDIC may, upon receiving the vertical synchronization signal VSYNC2 corresponding to the second frame, generate the packets such that the plurality of PICs PIC1 to PIC6 output the pulse modulation signals 2*a*0-2*a*5 and 2*b*0-2*b*5 corresponding to the second frame from the time points t10-*t*15.

As such, the PDIC may operate the BLU lines in synchronization with the line scan manner of the panel, and thereby the display device may display clear image.

Figure 13:
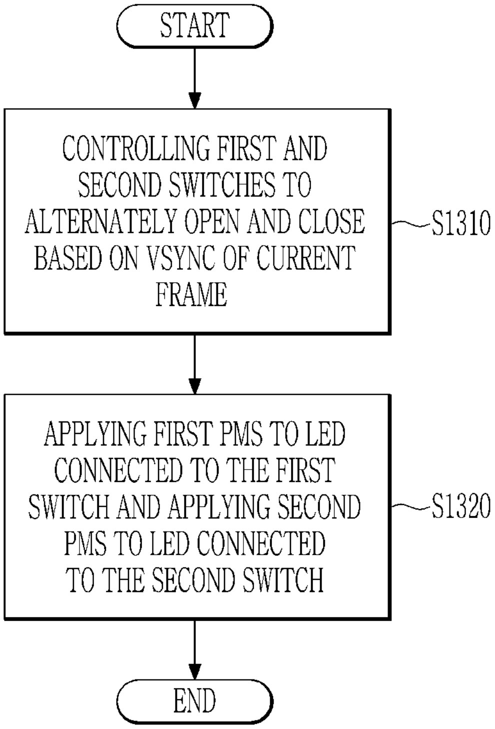
FIG. 13 is a flowchart illustrating a method for driving a backlight unit (BLU) according to an embodiment.

FIG. 13 is a flowchart illustrating a method for driving a BLU according to an embodiment.

Referring to FIG. 13, a method for driving a BLU according to an embodiment may be performed by the backlight module. The backlight module may include a switch, a PDIC, a PIC, and a BLU. The PDIC may be configured to control a switch connected to a first end of the LED of the BLU and a PIC connected to a second end of the LED. The BLU may include the plurality of LEDs.

In operation S1310, the PDIC may control the first switch and the second switch to alternately open and close based on the vertical synchronization signal VSYNC of the current frame. For example, the PDIC may generate the first switch control signal for controlling the first switch and the second switch control signal for controlling the second switch. The first switch control signal and the second switch control signal may be mutually exclusive within one frame display period. For example, when the first switch control signal is the high level, the second switch control signal may be the low level, and vice versa.

The PDIC may generate the first switch control signal and the second switch control signal such that the first switch and the second switch open and close at a period of the length of the subframe period.

In operation S1320, the PIC may apply the first pulse modulation signal (first PMS) to the LED connected to the first switch, and apply the second pulse modulation signal (second PMS) to the LED connected to the second switch. The PIC may apply the first pulse modulation signal when the first switch is closed, and may apply the second pulse modulation signal when the second switch is closed.

The PDIC may generate and transmit the timing information and the dimming data based on backlight data received from the outside, to the PIC. The PDIC may generate the timing information such that the level transition time point of the switch control signal matches the level transition time point of the pulse modulation signal. The PIC may generate first and the second pulse modulation signal based on the timing information and the dimming data.

A backlight module according to an embodiment may include the plurality of PICs controlled by the PDIC and the plurality of LEDs controlled by respective the PICs. For example, the plurality of LEDs may be disposed along a plurality of horizontal lines, and one PIC may control the LED of at least one horizontal line. For example, the plurality of PICs may include the first PIC configured to control the LEDs of a first horizontal line and the second PIC configured to control the LED of a second horizontal line different from the first horizontal line.

The PDIC may generate the timing information such that the plurality of LEDs emit light in synchronization with the line scan manner of the panel. The PDIC may the timing information such that the first PIC outputs the pulse modulation signal at the first time point, and the second PIC outputs the pulse modulation signal at the first time point or the second time point. The second time point may be later than the first time point. For example, the second time point may be lather by integer times of the length of the subframe period. The length of the subframe period may correspond to a slit length.

The PDIC may determine the frame display region based on quantities in the plurality of horizontal lines and the plurality of slits. The PDIC may generate the timing information based on the frame display region.

Figure 14:
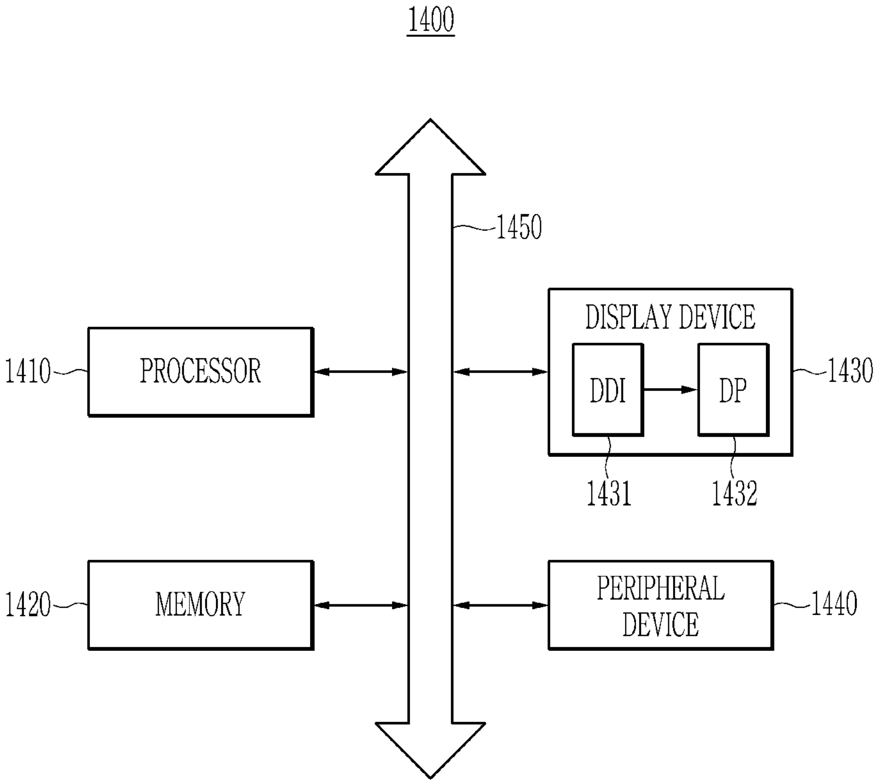
FIG. 14 is a diagram illustrating a semiconductor system according to an embodiment.

FIG. 14 is a diagram illustrating a semiconductor system according to an embodiment.

Referring to FIG. 14, a semiconductor system 1400 according to an embodiment may include a processor 1410, a memory 1420, a display device 1430, and a peripheral device 1440 that are electrically connected to a system bus 1450.

The processor 1410 may control the input and output of data from the memory 1420, the display device 1430, and the peripheral device 1440, and may perform image processing of image data transmitted between the corresponding devices.

The display device 1430 may include a display driver IC (DDI) 1431 and a display panel (DP) 1432, and may be configured to store the image data applied through the system bus 1450 in a memory included in the DDI 1431 and then display it to a display panel 1432. The PDIC described with reference to FIG. 1 to FIG. 13 may be integrated to the DDI 1431. That is, the DDI 1431 may emit light to the display panel 1432 using the PDIC, and the display panel 1432 may display an image by receiving the light emitted by the PDIC. The DDI 1431 may perform a control such that the PDIC and the display panel 1432 operates in the line scan manner. In some embodiments, the PDIC may be implemented separately from the DDI 1431 in the display device 1430.

The peripheral device 1440 may be a device that converts a video or still image into an electrical signal, such as a camera, scanner, or webcam. Image data obtained by the peripheral device 1440 may be stored in the memory 1420 or displayed on the display panel 1432 in real time.

The memory 1420 may include volatile memory such as dynamic random access memory (DRAM) and/or non-volatile memory such as flash memory. The memory 1420 may include DRAM, phase-change RAM (PRAM), magnetic RAM (MRAM), resistive RAM (ReRAM), ferroelectric RAM (FRAM), NOR flash memory, NAND flash memory, and a fusion flash memory (for example, a memory in which a static RAM (SRAM) buffer, a NAND flash memory, and a NOR interface logic are combined) or the like. The memory 1420 may store image data obtained from the peripheral device 1440 or image signals processed by the processor 1410.

The semiconductor system 1400 may be provided in a mobile electronic product such as a smart phone, a tablet PC, and the like, but is not limited thereto, and may be provided in various types of electronic products capable of displaying images.

In some embodiments, each component or combination of two or more components described with reference to FIGS. 1 to 14 may be implemented as a digital circuit, a programmable or non-programmable logic device or array, an application specific integrated circuit (ASIC), or the like.

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. A method for driving a backlight unit (BLU), the method comprising:
- controlling a first switch and a second switch to alternately open and close based on a vertical synchronization signal of a current frame;
- closing the first switch at a first time point in the current frame;
- based on the first switch being closed and the second switch being open:
  - generating, by a first pixel integrated circuit (PIC), a first pulse modulation signal based on a first packet output from a pixel driver integrated circuit (PDIC) and applying the first pulse modulation signal to a first backlight unit (BLU) line connected to the first PIC and corresponding to a first light emitting diode; and
  - generating, by a second PIC, a second pulse modulation signal based on a second packet output from the PDIC and applying the second pulse modulation signal to a second BLU line connected to the second PIC and corresponding to a second light emitting diode;
- closing the second switch at a second time point in the current frame; and
- based on the second switch being closed and the first switch being open:
  - generating, by the first PIC, a third pulse modulation signal based on the first packet output from the PDIC and applying the third pulse modulation signal to a third BLU line connected to the first PIC and corresponding to a third light emitting diode; and
  - generating, by the second PIC, a fourth pulse modulation signal based on the second packet output from the PDIC and applying the fourth pulse modulation signal to a fourth BLU line connected to the second PIC and corresponding to a fourth light emitting diode.

2. A backlight module, comprising:
- a pixel driver integrated circuit (PDIC) configured to generate a switch control signal and a pulse control signal, the pulse control signal comprising timing information and dimming data;
- a pixel integrated circuit (PIC) configured to generate a pulse modulation signal based on the pulse control signal;
- a switch group configured to transfer a driving voltage based on the switch control signal; and
- a backlight unit (BLU) comprising a first end connected to the switch group and a second end connected to the PIC, the BLU configured to emit light on a panel based on the driving voltage and the pulse modulation signal,
- wherein the PDIC is configured to generate the switch control signal and the pulse control signal such that a light emitting diode emits light at a time point at which a pixel of the panel operates.

3. The backlight module of claim 2, wherein the switch group comprises a first switch and a second switch;

wherein the PDIC is further configured to generate, in one frame display period, a first switch control signal for controlling the first switch and a second switch control signal for controlling the second switch; and wherein the first switch control signal and the second switch control signal are mutually exclusive.

4. The backlight module of claim 3, wherein the PDIC is further configured to generate the first switch control signal and the second switch control signal based on a length of a subframe period.

5. The backlight module of claim 3, wherein the BLU comprises a first light emitting diode connected to the first switch and a second light emitting diode connected to the second switch; and wherein the PIC is further configured to:

generate a first pulse modulation signal causing the first light emitting diode to emit light at a time point at which the first switch is closed; and generate a second pulse modulation signal causing the second light emitting diode to emit light at a time point at which the second switch is closed.

6. The backlight module of claim 2, wherein the PDIC is further configured to generate the timing information such that a level transition time point of the pulse modulation signal matches a level transition time point of the switch control signal.

7. The backlight module of claim 6, wherein the PDIC is further configured to generate the timing information such that a time point at which the pulse modulation signal transitions from a low level to a high level matches a time point at which the switch control signal transitions from a first level to a second level.

8. The backlight module of claim 2, wherein the BLU further comprises a first light emitting diode provided in a first line and a second light emitting diode provided on a second line that is below the first line;

wherein the PIC comprises a first PIC configured to control the first light emitting diode and a second PIC configured to control the second light emitting diode; and wherein the PDIC is further configured to:

output a first pulse control signal comprising first timing information to the first PIC, and output a second pulse control signal comprising second timing information to the second PIC, the second timing information being different from the first timing information.

9. The backlight module of claim 8, wherein the PDIC is further configured to generate the first pulse control signal and the second pulse control signal based on a frame display region.

10. The backlight module of claim 9, wherein the PDIC is further configured to determine the frame display region based on a quantity of horizontal lines and a quantity of slits on which a plurality of light emitting diodes are provided in the BLU.

11. The backlight module of claim 8, wherein the PDIC is further configured to generate the first pulse control signal and the second pulse control signal, such that the first PIC outputs a first pulse modulation signal corresponding to a first frame at a first time point, and the second PIC outputs a second pulse modulation signal corresponding to the first frame or a third pulse modulation signal corresponding to a second frame preceding the first frame at the first time point.

12. The backlight module of claim 11, wherein the PDIC is further configured to, based on generating the second pulse control signal such that the second PIC outputs the third pulse modulation signal at the first time point, generate the second pulse control signal such that the second PIC outputs a fourth pulse modulation signal corresponding to the first frame at a second time point later than the first time point by a predetermined delay.

13. The backlight module of claim 12, wherein a PDIC is further configured to determine the predetermined delay based on a length of a subframe period.

14. The backlight module of claim 8, wherein the PDIC is further configured to:

determine a pause period in one frame display period; and generate the first pulse control signal and the second pulse control signal such that the first PIC and the second PIC similarly operate based on the first pulse control signal and the second pulse control signal in the pause period.

15. A display device, comprising:

a controller configured to generate a backlight data and a driving control signal based on an image signal;

a driver circuit configured to generate, based on the driving control signal, a scan signal and a pixel signal;

a panel comprising a plurality of pixels, the panel configured to, based on the scan signal and the pixel signal, receive light and display an image; and a backlight module comprising:

a backlight unit comprising a first backlight unit (BLU) line, a second BLU line, a third BLU line and a fourth BLU line, wherein the first BLU line, the second BLU line, the third BLU line and the fourth BLU line are located in different rows;

a first switch connected to the first BLU line and the second BLU line; and a second switch connected to the third BLU line and the fourth BLU line.

16. The display device of claim 15, wherein the first switch and the second switch operate mutually exclusively between a first time point when a vertical synchronization signal included in the backlight data transitions to logic high and a second time point when the vertical synchronization signal transitions to the logic high.

17. The display device of claim 16, wherein the backlight module further comprises a pixel driver integrated circuit (PDIC) configured to control brightnesses of a plurality of light emitting diodes corresponding to the first to fourth BLU lines.

18. The display device of claim 17, wherein the backlight module further comprises:

a first pixel integrated circuit (PIC) configured to control, based on a first packet provided from the PDIC, the first BLU line and the third BLU line; and a second PIC configured to control, based on a second packet provided from the PDIC, the second BLU line and the fourth BLU line.

19. The display device of claim 18, wherein the first PIC is configured to start to provide, to the first BLU line, a first pulse width modulation (PWM) signal corresponding to a first frame at a third time point, and wherein the second PIC is configured to start to provide, to the second BLU line, a second PWM signal corresponding to the first frame at a fourth time point after the third time point.

20. The display device of claim 18, wherein the PDIC is further configured to generate the first packet and the second packet based on the vertical synchronization signal.

* * * * *